(12) United States Patent
Jackson

(10) Patent No.: US 11,900,396 B2
(45) Date of Patent: *Feb. 13, 2024

(54) SYSTEMS AND METHODS FOR GENERATING A RELATIONSHIP AMONG A PLURALITY OF DATASETS TO GENERATE A DESIRED ATTRIBUTE VALUE

(71) Applicant: James R Jackson, Bryan,, TX (US)

(72) Inventor: James R Jackson, Bryan,, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/658,022

(22) Filed: Apr. 5, 2022

(65) Prior Publication Data

US 2022/0230192 A1 Jul. 21, 2022

Related U.S. Application Data

(63) Continuation of application No. 16/281,025, filed on Feb. 20, 2019, now Pat. No. 11,341,513.

(60) Provisional application No. 62/807,810, filed on Feb. 20, 2019, provisional application No. 62/632,941, filed on Feb. 20, 2018.

(51) Int. Cl.
| | |
|---|---|
| *G06Q 30/0201* | (2023.01) |
| *G06F 16/28* | (2019.01) |
| *G06N 20/20* | (2019.01) |
| *G06N 20/10* | (2019.01) |
| *G06Q 10/0631* | (2023.01) |

(52) U.S. Cl.
CPC ....... *G06Q 30/0201* (2013.01); *G06F 16/288* (2019.01); *G06N 20/10* (2019.01); *G06N 20/20* (2019.01); *G06Q 10/06315* (2013.01)

(58) Field of Classification Search
CPC .......... G06Q 30/0201; G06Q 10/06315; G06F 16/288; G06N 20/10; G06N 20/20; G06N 3/084; G06N 3/126; G06N 5/003; G06N 5/041; G06N 5/048; G06N 7/005
See application file for complete search history.

(56) References Cited

U.S. PATENT DOCUMENTS

| | | | | |
|---|---|---|---|---|
| 9,336,433 | B1* | 5/2016 | Ortiz | G06T 11/60 |
| 11,341,513 | B2* | 5/2022 | Jackson | G06N 20/10 |
| 2006/0294095 | A1 | 12/2006 | Berk | |
| 2011/0103682 | A1 | 5/2011 | Chidlovskii et al. | |
| 2011/0213741 | A1 | 9/2011 | Shama | |
| 2012/0166348 | A1 | 6/2012 | Dyagilev et al. | |
| 2014/0079198 | A1 | 3/2014 | Mankar et al. | |
| 2017/0005515 | A1 | 1/2017 | Sanders et al. | |
| 2017/0228661 | A1 | 8/2017 | Chien et al. | |
| 2018/0316571 | A1* | 11/2018 | Andrade | G06Q 10/101 |
| 2019/0312791 | A1 | 1/2019 | Ligata et al. | |
| 2019/0095478 | A1* | 3/2019 | Tankersley | G06F 16/288 |

OTHER PUBLICATIONS

International Searching Authority, Written Opinion of the international Searching Authority, dated May 19, 2019, PCT/US2019/018838, Internet.
PCT, International Search Report, dated May 14, 2019, PCT/US2019/018838, Internet.

* cited by examiner

*Primary Examiner* — Wilson Lee
(74) *Attorney, Agent, or Firm* — McAughan Deaver PLLC

(57) ABSTRACT

A system or method for identifying a plurality of entities in a first dataset that satisfy a predetermined target attribute by deploying on the first dataset a relationship model generated from a second dataset having a plurality of entities not in the first dataset.

20 Claims, 8 Drawing Sheets

SYSTEMS AND METHODS FOR GENERATING A RELATIONSHIP AMONG A PLURALITY OF DATASETS TO GENERATE A DESIRED ATTRIBUTE VALUE

CROSS REFERENCE TO RELATED APPLICATIONS

This application claims benefit of and priority to U.S. Patent Application No. 62/807,810, entitled Methods and Systems for Identifying Entities Having Predicted Attribute, filed on Feb. 20, 2019, the entire contents of which are incorporated herein by reference for all purposes. This application also claims benefit of and priority to U.S. Patent Application No. 62/632,941, entitled Machine Learning to Analyze Data for Generation of a Parameter, filed on Feb. 20, 2018, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to correlating one or more datasets to generate a relationship function indicative of a desired attribute, which relationship function can be applied to other datasets to predict dataset members having a desired attribute.

Description of the Related Art

In most relationships, success is identified by a long, mutually beneficial exchange between the parties. An earlier than expected end or breach of the relationship can be disruptive and costly. Most parties, whether individual, businesses, or other entities, would prefer to maintain the relationship for as long as possible, yet early defection from relationships remain at stubbornly high levels. Many major providers of services and goods have seen their organizations reach a growth plateau with efforts to attract new users of the goods or services offset by an equal or greater quantity of defections by existing users.

Several global consulting firms have established practice groups devoted to providing user retention strategies and advice to both legacy providers and new entrants. Proprietary techniques have been developed to analyze behaviors of existing users and create strategies to identify potential defecting users and incentivize them to remain. Other techniques investigate the provider's processes to identify and eliminate anything that might cause a user to defect. Still other techniques focus on the initial user experience to increase the level of user satisfaction during the onboarding process.

These efforts to increase user retention or duration have proved difficult and costly to implement. The expense of providing additional incentives for users along with the additional efforts of developing a retention strategy often may be greater than the existing losses from user defection.

After spending billions of dollars and years of effort, the issue of user defection shows little sign of abating. For example, it is understood that charities lose about 46% of their donors each year; retail energy loses about 35% of its subscribers each year; about 25% of wireless telecom users change providers each year; an estimated $10 from every monthly wireless bill goes to offset the cost of user defection; property and casualty coverage providers estimate the worldwide cost of defection in their industry is $470 billion; about 25% of new bank accounts are closed within the first year, with more than 12% closed in the first 90 days; about 80 billion mobile apps are downloaded each year, but more than 75% of those downloads are uninstalled in the first 90 days; about 30% of new college freshmen don't return for their sophomore year and about 50% fail to graduate within six years; new nurses and new teachers leave their respective fields at much higher rates than more experienced employees; and school districts in the United States spend an estimated $2.2 billion annually to replace teachers who leave the field early.

Thus, the present inventions are directed to providing a solution to the problem of user defection and/or lack of user retention/duration that is robust, widely available, and effective.

BRIEF SUMMARY OF THE INVENTION

A brief non-limiting summary of one of the many possible embodiments of the present invention is a system configured to identify one or more potential users from information collected about a plurality of entities comprising one or more servers having associated processors and memory. An information collection module may be configured to collect entity information and to generate a first dataset of entity information. An interface may be configured to receive information about a provider's existing and former users, and configured to allow the provider to specify one or more desired characteristics of a potential user. A processing module, may be configured to create a user dataset from the user information, which dataset is compatible with the first dataset. A relationship module may be configured to generate one or more relationships for the user dataset that associates with each user one more values representative of the one or more desired characteristics. And, an application module may be configured to deploy the one or more relationships on the first dataset to generate for each entity one more values representative of one or more the desired characteristic.

Additionally or alternately, the relationship module may comprises hardware logic and hardware executable code configured to implement a learning algorithm on the user dataset and to generate a model function for the user dataset configured to predict the one more desired characteristic for each user. The first dataset may comprise entity information collected from a plurality of computing devices. The first dataset may comprise location data for one or more entities. The user dataset may comprise data for each user related to the desired characteristic. The user dataset may be split into a training dataset, a validation dataset, and testing dataset for the learning algorithm. The first dataset may be modified to remove all data for entities that are also users before the one or more relationship is deployed on the first dataset. The user dataset may be augmented with data for entities in the first dataset that correspond to users in the user dataset before the one user dataset is split. The desired characteristic may comprise duration.

A brief non-limiting summary of another of the many possible embodiments of the present invention is a method for identifying potential users from a first dataset containing entity information comprising creating a first dataset of entity information. Receiving information concerning existing and/or former users of a provider. Creating a second dataset of the existing and/or former users of the provider from at least information received from the provider. Generating a relationship for the second dataset configured to establish a value for each user in the second dataset concerning a preselected attribute. Applying the relationship to at least a first portion of the first dataset to establish a value for each entity in the at least first portion concerning the preselected attribute. And, identifying potential users in the first dataset based on the attribute value.

Additionally or alternately, generating the relationship may comprise configuring hardware logic and hardware executable code to implement a learning algorithm on the second dataset and to generate a model function for the second dataset to predict the one more desired characteristic for each user. Collecting entity information collected from a plurality of computing devices to create first dataset. The first dataset may comprises location data for one or more entities. The user dataset may comprise data for each user related to the desired characteristic. The user dataset may be split into a training dataset, a validation dataset, and testing dataset for the learning algorithm. Modifying the first dataset to remove all data for entities that are also users before the one or more relationship is deployed on the first dataset. Augmenting the user dataset with data for entities in the first dataset that correspond to users in the user dataset before the user dataset is split. The desired characteristic may comprise duration.

A brief non-limiting summary of yet another of the many possible embodiments of the present invention is a system configured to identify one or more users from information collected about a plurality of user of a provider comprising one or more servers having associated processors and memory. An information collection module configured to collect entity information and to generate a first dataset of entity information. An interface configured to receive information about a provider's existing and former users, and configured to allow the provider to specify one or more desired characteristics of its users. A processing module, configured to create a user dataset from the user information, which dataset is compatible with the first dataset. A relationship module configured to generate one or more relationships for the first dataset that associates with each entity one more values representative of the one or more desired characteristics. And, an application module configured to deploy the one or more relationships on the user dataset to generate for each user one more values representative of one or more the desired characteristic.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to demonstrate further certain aspects of the present invention. The invention may be better understood by reference to one or more of these figures in combination with the detailed description of specific embodiments presented herein.

Figure 1:
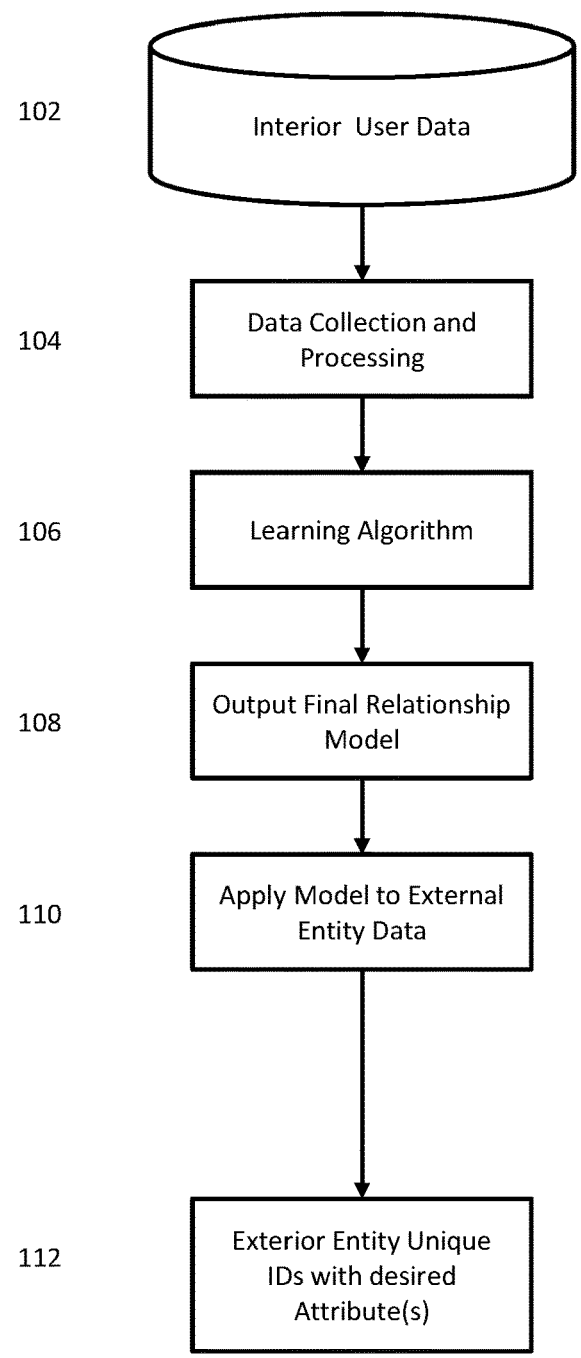
FIG. 1 illustrates a data flow of an embodiment of the present inventions.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what I have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Aspects of the inventions disclosed herein may be embodied as an apparatus, system, method, or computer program product. Accordingly, specific embodiments may take the form of an entirely hardware embodiment, an entirely software embodiment or an embodiment combining software and hardware aspects, such as a "circuit," "module" or "system." Furthermore, embodiments of the present inventions may take the form of a computer program product embodied in one or more computer readable storage media having computer readable program code.

Items, components, functions, or structures in this disclosure may be described or labeled as a "module" or "modules." For example, but not limitation, a module may be configured as a hardware circuit comprising custom VLSI circuits or gate arrays, off-the-shelf semiconductors such as logic chips, transistors, or other discrete components. A module also may be implemented as programmable hardware devices such as field programmable gate arrays, programmable array logic, programmable logic devices, or the like. Modules also may be configured as software for execution by various types of processors. A module of executable code may comprise one or more physical or logical blocks of computer instructions that may be organized as an object, procedure, or function. The executables of a module need not be physically located together, but may comprise disparate instructions stored in different locations that when joined logically together, comprise the module and achieve the stated purpose or function. A module of executable code may be a single instruction, or many instructions, and may even be distributed over several different code segments, among different programs, and across several memory devices. Similarly, data may be identified and illustrated herein within modules, and may be embodied in any suitable form and organized within any suitable type of data structure. The data may be collected as a single dataset, or may be distributed over different locations including over different storage devices, and may exist, at least partially, merely as electronic signals on a system or network. Where a module or portions of a module are implemented in software, the software portions may be stored on one or more computer readable storage media.

When implementing one or more of the inventions disclosed herein, any combination of one or more computer readable storage media may be used. A computer readable storage medium may be, for example, but not limitation, an electronic, magnetic, optical, electromagnetic, infrared, or semiconductor system, apparatus, or device, or any suitable combination of the foregoing. More specific, but non-limiting, examples of the computer readable storage medium may include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this disclosure, a computer readable storage medium may be any tangible medium that can contain, or store a program for use by or in connection with an instruction execution system, apparatus, or device.

Computer program code for carrying out operations of one or more of the present inventions may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an exterior computer for example, through the Internet using an Internet Service Provider.

Reference throughout this disclosure to "one embodiment," "an embodiment," or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood by those of skill in the art that each block of the schematic flowchart diagrams and/or schematic block diagrams, and combinations of blocks in the schematic flowchart diagrams and/or schematic block diagrams, may be implemented by computer program instructions. Such computer program instructions may be provided to a processor of a general purpose computer, special purpose computer, or other programmable data processing apparatus to create a machine or device, such that the instructions, which execute via the processor of the computer or other programmable data processing apparatus, structurally configured to implement the functions/acts specified in the schematic flowchart diagrams and/or schematic block diagrams block or blocks. These computer program instructions also may be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions also may be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and/or operation of possible apparatuses, systems, methods, and computer program products according to various embodiments of the present inventions. In this regard, each block in the schematic flowchart diagrams and/or schematic block diagrams may represent a module, segment, or portion of code, which comprises one or more executable instructions for implementing the specified logical function(s).

It also should be noted that, in some possible embodiments, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they do not limit the scope of the corresponding embodiments. Indeed, some arrows or other connectors may be used to indicate only the logical flow of the depicted embodiment. For example, but not limitation, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and computer instructions.

The description of elements in each Figure may refer to elements of proceeding Figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Turning now the present inventions, there is a growing body of evidence that an individual's affinity for long term, stable personal relationships extends to a similar affinity for long term, stable relationships with entities of all types. These individuals tend to finish school, stay in jobs, and establish longer lasting relationships with businesses, charities, and social organizations, that is, with providers of goods and/or services.

There are also individuals who live their lives in opposite manner, preferring a series of shorter duration or limited relationships with other individuals as well as providers. Naturally, there are also individuals whose relationship behaviors fill the spectrum between these two extremes.

While there is no commonly accepted explanation for these differences, research on human behavior from multiple disciplines provides some theories, such as:

Studies of human temperament indicate that approximately 30% of the population could be considered "novelty seeking" and having an innate emotional response that primes them to seek new and different experiences.

Behavioral geneticists have identified a gene variant that correlates with lower levels of satisfaction, affection, cohesion, and consensus in relationships.

MRI scans of some individuals had greater activation in the brain areas concerned with emotion and memory retrieval suggesting a propensity to develop an affective bond with a particular brand.

Certain cultures place a higher value on maintaining relationships.

Education, age, rural vs urban living, and certain careers have shown moderate correlations with relationship duration.

While some individuals make spontaneous decisions about relationships, others are overly cautious and expend a large amount of time and effort before making a decision. The second group tends to have longer relationships, possibly because they make better decisions, or they simply remain in the relationship to avoid the effort of revisiting the decision.

Apathy or simple laziness leads to extended time in relationships.

While the possible reasons are varied and could occur in multiple combinations in a single user, they tend to be revealed as a general tendency for longer or shorter durations in the user's existing or prior relationships. This individual tendency for long or short duration relationships is more difficult to recognize in a single or small number of relationships, but is believed to become more evident as the number of relationships with different providers increases for a particular user.

For example, when analyzing multiple users of a single provider, there could be an instance where the provider had a service interruption or other problem at an earlier date. The "early defector" may be included in the "noise" of a number of other, more persistent users who were forced to end the relationship (i.e., defect) because of the service interruption. However, when looking at the "early defector" across relationships with other providers, that particular user's propensity for short relationships may stand out from the noise of the relationship with the "service interruption" provider.

Those of skill in the art having benefit of this disclosure will understand that I have created methods and systems structurally configured to measure or predict a user attribute, such as retention or duration, to allow entities, such as, but not limited to, providers of goods and/or services to identify potential new users with the predicted desired attribute prior to interacting with the potential new user. My inventions may comprise a first dataset, which in some embodiments may be referred to as an exterior dataset, that is developed from various entity interactions with a plurality of providers, such as businesses, charities, and social media, that create information associated with an entity. Preferably, these entity interactions will occur with or on mobile devices, desktop devices and Internet of Things (IoT) devices, but the interactions may occur in any setting. Prior to finalization of the first dataset, the data may be processed to prepare the data for the dataset. Upon finalization, the first dataset may include a plurality of tuples, each of which comprises a plurality of information-containing attributes for an individual entity.

A second dataset, which in some embodiments may be referred to as an interior dataset, may be created from existing customer, user, or subscriber (hereafter "user") information with a particular provider. The information about the provider's users may come from interactions with the provider, and/or from additional information, including third-party information, about the provider's existing or former users. Prior to finalization of the second dataset, the data may be processed to prepare the data for the dataset. For example, but not limitation, identities within the interior data may be correlated. Other processing of the interior data may be provided.

In a preferred embodiment, tuples in the first dataset corresponding to tuples in the second dataset may be flagged, or blocked, or a modified first dataset without the second data set tuples may be created.

After the first and second dataset have been finalized, or the modified first and second dataset have been finalized (e.g., after processing), a relationship model, such as a model or function created by a learning algorithm, or statistical model, may be generated to predict one or more attributes for each user in the second dataset. For example, and not limitation, the second dataset may comprise a tuple attribute corresponding to provider duration. A relationship model may be generated to predict a provider duration value for each of the provider's existing users. The second dataset, which may be referred to in this embedment as a training dataset, may be divided, or parsed into multiple datasets for use in developing, validating, and testing the relationship model. Once the second dataset relationship model is finalized, the relationship model from the training data set may be applied to the first dataset or the modified first dataset to generate an output of potential new users for the provider likely having the attribute (e.g., duration) desired by the provider. For example, certain providers may desire short-duration customers, while other providers may desire long-duration customers.

Turning now to a discussion of several possible embodiments of my inventions, FIG. 1 illustrates interior user data 102 that has been collected and processed 104 by the system 100 to create or define an interior or second dataset comprising tuples for users of a specific provider. A learning algorithm module 106 may be applied to the second dataset set to create a relationship model, such as a function, that predicts one or more attributes for each user in the interior dataset. The model or function may be validated and tested according to known learning algorithm methods to create a final relationship model 108 for the interior dataset. Once finalized, the interior dataset model may be applied 110 to an exterior or first dataset to identify 112 those entities in the first data set having one or more attributes predicted by the model.

Figure 2:
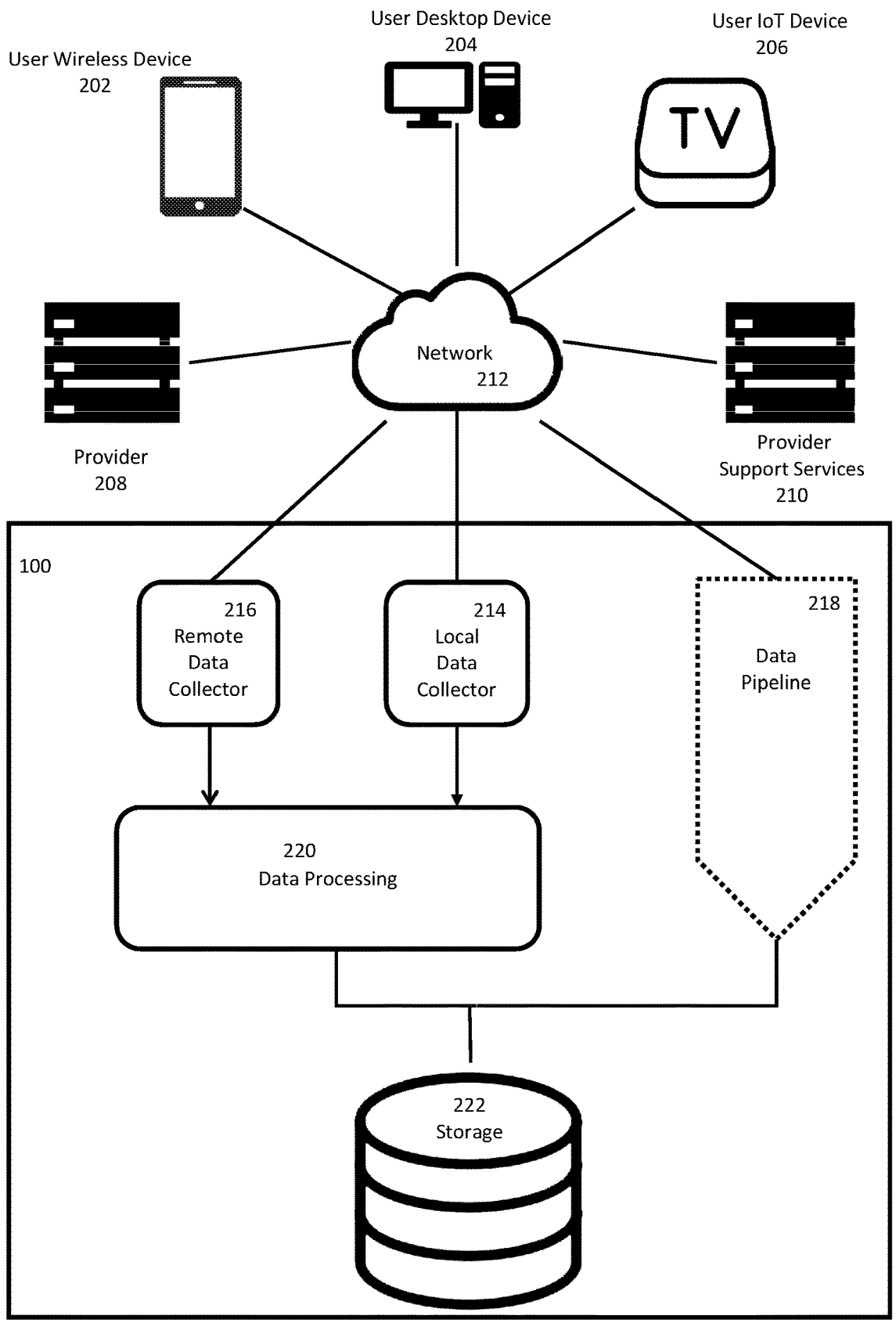
FIG. 2 illustrates possible sources of data for the exterior and interior datasets for the use with the present inventions.

FIG. 2 illustrates a networked environment from which information or data may be collected for users and other entities to populate or augment the exterior and/or interior datasets. It is preferred, but not required, that the primary sources of data be mobile devices 202, desktop computers 204, and Internet of Things devices 206, collectively referred to herein as "computing devices." As will be understood from this disclosure, regardless of the source of the data, a preferred objective is to collect a unique entity or user identifier, such as through a particular computing device, from the data, and then identify interactions by that entity or from a computing device associated with that entity. All attributes or characteristic of the interactions gleaned from the data may be linked to or associated with the appropriate entity as part of processing 202 the collected data. It will be appreciated that to ultimately predict a first dataset attribute of an entity based on a relationship model trained on a second dataset, the second or training dataset should contain at least one targeted attribute or characteristic of each user in the training dataset.

In FIG. 2, the network 212 may be any type of information network, including, without limitation, a wired or wireless network, and may have any number of configurations such as a star configuration, token ring configuration, or other configuration. Furthermore, the network 212 may comprise a local area network (LAN), a wide area network (WAN) (e.g., the Internet), and/or any other interconnected data path across which multiple devices may communicate. In yet another embodiment, the network 212 may be a peer-to-peer network. The network 212 also may be coupled to or include portions of a telecommunications network for sending data in a variety of different communication protocols. In yet another embodiment, the network includes Bluetooth communication networks or a cellular communications network for sending and receiving data such as via short messaging service (SMS), multimedia messaging service (MMS), hypertext transfer protocol (HTTP), direct data connection, WAP, email, and the like.

Access to the exterior network may be provided by a gateway node or similar device. A gateway may be implemented in software or hardware to provide translation between systems that do not use the same communications protocols, data-formatting structures, languages, or architecture. Gateways may be configured with various software or hardware devices to provide filtering, screening, authentication, and security functions as a proxy server or firewall. Additional configurations might provide for Network Address Translation (NAT), caching services, impedance matching, rate conversion, and fault isolation.

A mobile device 202 may contain at least one wireless network interface for data communications. The interface may be Wi-Fi, cellular, or other technologies that connect the device 202 to the Internet or to other data networks. Smartphones, PDAs, tablets, and IPads are typical examples of mobile devices 202. A Desktop Computer 204 typically contains a modem, and possibly a router for connecting to the Internet by an Ethernet connection or by Wi-Fi. The Internet of Things (IoT) devices 206 are a rapidly growing and changing field with no universally accepted definition. A current definition may be a wired or wireless network of uniquely identifiable connected devices that are able to process data and communicate with each other with or without human involvement. Non-limiting examples of IoT devices 206 include wearable devices: smart watches, fitness trackers, GPS watches, head-mounted optical displays, body cameras, and medical monitoring devices; home devices and appliances: smart refrigerators, washers and dryers, ovens, water heaters, coffee makers, thermostats, security systems, cameras, lock systems, lighting systems, irrigation systems, door bells, garage openers, and meters; electronic devices: smart TVs, set top boxes, DVRs, game systems, music systems, routers, and virtual assistants (e.g., Siri, Alexa, and Cortana); smart automobiles, drones, pet feeders, pet locators, and maintenance prediction systems.

A provider 208 typically offers one or more services and/or goods to a user of the goods or services, but also includes non-commercial organizations. For example, but not limitation, a provider 208 may provide a website, mobile app, wireless communication services, email, information, storage, news, weather or other online product or service. Offline, a provider 208 may have a bricks and mortar business model or other methods of providing goods or services distinct from, or in combination with, its online services, or products, such as magazines, movies, clothing, health clubs, hotels, and/or airlines.

A provider of support services 210 (PSS) may provide products and/or services to a provider 208, to aid the provider 208 in providing its products or services to a user. Non-limiting examples of a PSS 210 include advertising, logistics, marketing, crash detection, billing, analytics and other products or services to be utilized by a service provider. In addition or alternately, a PSS 210 may receive data from the provider 208, or may embed their own trackers in computing devices to receive the data directly from the user.

In the online environment, users interact with a provider 208 during a session over a network 212. Activity during that session generates information (data) that gives insight into the behavior, attributes, or characteristics of the user, as well as information about the channel utilized and information about the identity of the user. Data also may be collected by one or more PSS 210.

Interactions from computing devices 202, 204, 206 generate data streams that can be acquired by data collection tools or trackers on those computing devices. These data streams may contain user-interaction data, device resident data, application resident data, or sensor data. Additionally, these data collection tools may have access to device log files containing communication and device status related periodic information, status logs, operating system and device hardware information, user credentials, and other user and device details.

Typically, data collection tool, such as trackers, are configured to collect a broad, valuable range of data, but not all data is available for collection. Many countries, for example, have placed restrictions on the types of data that can be collected, and the methods of collection. Some require parental consent for collection of data from minors. Many place restrictions or prohibitions on collecting Personally Identifiable Information. There are multiple requirements for notice and consent from users and various methods for providing consent. Many of these restrictions include fines or criminal penalties for violations.

Mobile devices 202 provide potential access to a broad range of interaction attributes, and the addition of user location data provides insight not available from most other computing devices. However, mobile devices 202 may have problems with network stability, and trackers can have a negative effect on the owner experience due to limitations on bandwidth, storage, processing power, and battery life. Trackers are designed for specific purposes, and many only collect a narrow set of data. Also, many app stores prohibit the inclusion of certain types of trackers in approved mobile apps. A continuous stream of innovation has led to the development of multiple methods of blocking advertising and other types of trackers, which has led to development of less obtrusive methods of advertising and new methods of tracking that are more difficult to block.

Some information is collected for the benefit of the owner of the computing device 202, 204, 206 owner by improving the browsing experience and remembering logins. Other information is collected for the benefit of the publisher or developer by, for example, collecting information about frequency of use, identifying possible bugs, and other analytics. However, the vast majority of data collected by trackers is used as part of a process to create targeted offers, from either the publisher or third parties.

A large number of different cookies have been developed for specialized activities, including ad networks, third-party analytics services, hosting platforms and content providers. Some modified methods of tracking use different names, like E-tags, Flash cookies, HTML5 Local Storage, pixel tags, and Flash LSOs. Other trackers, including clear GIFs, web beacons, or web bugs, have been designed to work in combination with cookies for better performance. Web widgets have become popular with social networking sites, in the form of a "like button" or something similar that can be placed on other web pages. When a user clicks on the "button" at a third party site, it allows the owner of the "button" to track that user across multiple sites.

As methods of blocking HTTP cookies have increased, developers have created multiple stateless (fingerprinting) technologies to correlate web activities without setting a unique ID on the user's machine. Some methods use a script that can combine subtle variations in common computer device properties to create a unique device profile. For example, combinations of CPU type, clock skew, display settings, and installed fonts typically show unique but consistent differences. Other methods use a passive technique to analyze unique variations in network traffic in a manner that is virtually undetectable.

Figure 3:
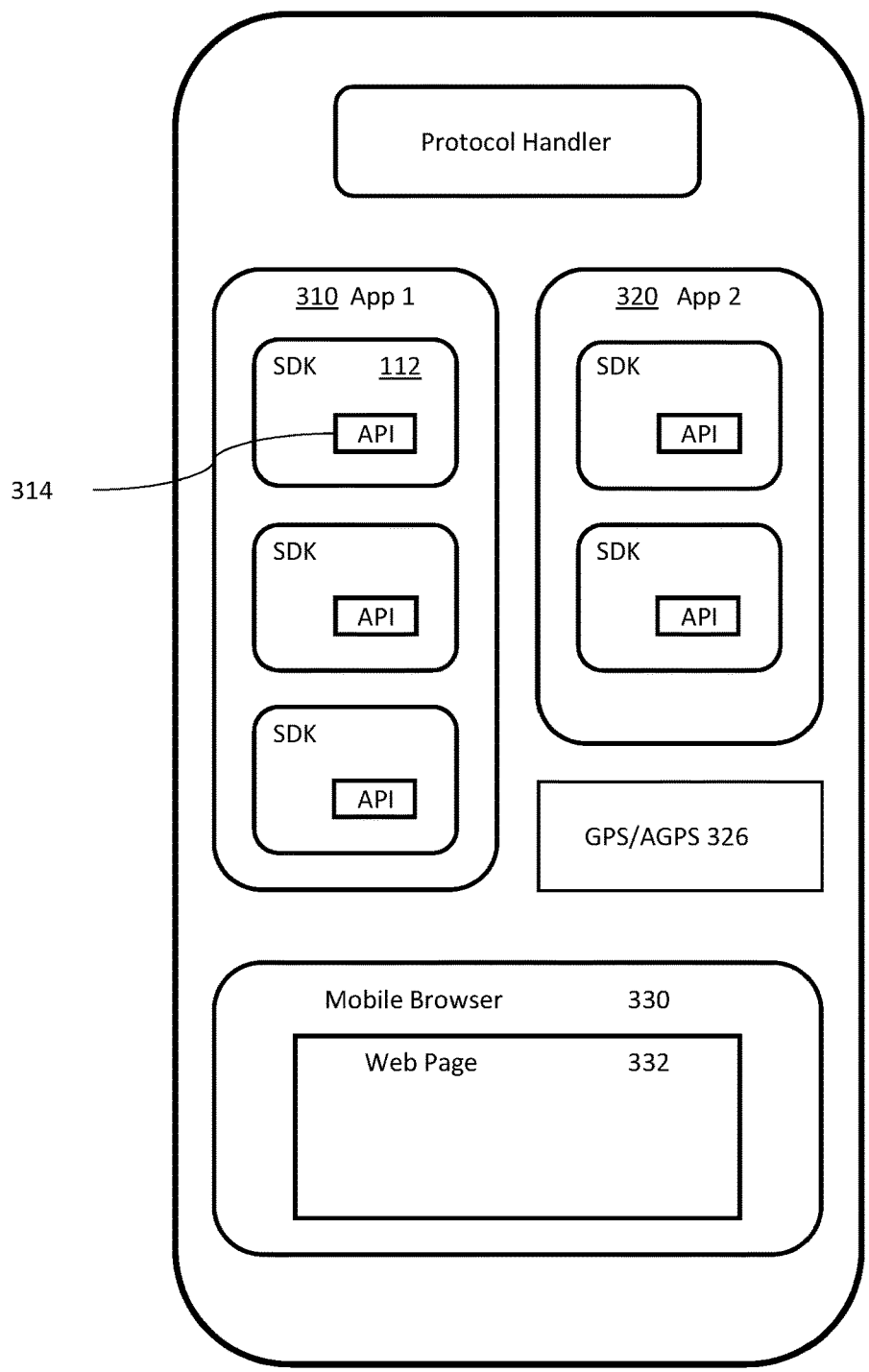
FIG. 3 illustrates data trackers on a mobile device that may supply data for the exterior and/or interior datasets of the present inventions.

FIG. 3 illustrates a typical mobile device 202 with installed mobile apps 310 and 320. Each mobile app contains one or more software development kits (SDKs) 312 from one or more providers 208 or PSS 210. Each SDK 312 may have access to one or more application programming interface (API) 314. The mobile device 202 may also include a mobile browser 330 for access to web pages 332.

Mobile device 202 data tracking is somewhat different from tracking a desktop computer 204, since mobile devices 202 provide user interactions with mobile apps 310, 320, as well as mobile web browsers 330. Mobile devices 202 also may provide valuable information from location data derived from GPS 326, cell tower triangulation or Wi-Fi IP addresses. Additionally, most mobile devices 202 include a camera and microphone, and the ability to send and receive phone calls and SMS messages, all of which create a substantial pool of additional data for analysis and inference. In most western countries, mobile devices 202 are typically used by only one person, which provides for the ability to produce a much more granular profile than desktop computers 204 or other devices that might be used by multiple entities.

Mobile web browsers 330 and mobile applications 310, 320 typically do not provide access to the same types of data, and require different methods when tracking and collecting data. Data from mobile web browsers 330 is generally limited to information that is viewed on the web. Mobile web pages have page views and session cookies, and mobile websites use Java-based page tagging. Mobile applications 310, 320 use SDKs 312 to track data from user interactions, and use screen views and unique IDs instead of page views and session cookies. A significant advantage of mobile applications 310, 320 for data collection is the ability to operate offline while still tracking and collecting data and the ability to access information about the mobile device 202, including logs and information in the device's interior storage.

A growing number of mobile applications interact with the GPS location system 326 of a mobile device 202 to provide information tailored to the local area or other location related features. With multiple apps active at the same time, it is not unusual for an individual mobile device to report its GPS location information thousands of times each month. This creates a wealth of data that is captured by providers and may be utilized for creating the first dataset of the present inventions.

GPS coordinates are available for virtually every structure and location (e.g., home, business, school, church) and geographic feature. A computing device's GPS location information captured by a provider and added to the first dataset may be mapped to the known GPS coordinates, and used to create one more attributes showing the preferences and durations of the entity's daily activities. For example, the first dataset may show how long an entity has been shopping at a certain store, or buying a certain brand of gas, or working at the same location, or living at the same location, or eating at the same restaurant or attending a certain church. Further, comparison of data may show whether an entity has visited a location exclusively (e.g. always used the same brand of gas) or if the user patronized multiple establishments of the same category.

While this GPS information is potentially very predictive, it also may create a problem because of the massive volume of data. Each mobile device 202 can report GPS coordinates thousands of times each month. One PSS 210 may be tracking and collecting this data from more than a billion devices scattered around the world through a distributed network of servers deployed in multiple countries. This of course can be multiplied times thousands of providers 208 and PSSs 210 collecting this type of data. Each computing device may be reporting its GPS coordinates through multiple trackers multiple times each hour, even though the user often remains in the same location for extended periods. This type of duplicate data may be removed by processing the data, but this would this would consume a large amount of storage and CPU processing resources.

As illustrated in FIG. 2, data, e.g., raw data, about an entity's interactions with a plurality of providers may be collected form the network 212 by system 100 through a remote data collector 216, a local data collector 214, or a data pipeline 218, as is known by those of skill in the art. Once collected, the raw data may be processed 220 to, for example, but not limitation, correlate data to a unique entity identifier, or correlate interactions to one or more entity or interaction attributes or characteristics. Once sufficiently processed, the data may be stored 222 on individual server, multiple servers, or servers in multiple locations. In some embodiments, the data may be collected by using a hardware or software-based data pipeline 218, which may replace or eliminate many of the usual data processing 220 steps.

As can be appreciated, the volume of data and variety and variability of data sources makes the exterior dataset very complex. The collected data may be grouped generally into five categories: Identity; Behavioral; Device; Location, and Sensor. Identity Data may include information that attaches to an individual computing device user, including demographic and account ownership information, such as, Name, User ID, Login, email address, phone number, gender, age, photograph, income, and business email. A unique dataset identifier may be, and preferably is created for each identified computing device user to allow linking additional data (e.g., attributes or characteristics) with that identified entity.

Behavioral Data may be collected by tracking user actions, activities and behaviors, such as, without limitation, websites visited, search terms entered, travel, purchases, apps accesses, duration, and frequency of usage, subscriptions, social interactions, and videos watched.

Device Data may include information about the characteristics of the entity's computing device (e.g., mobile device 202, desktop 204, and IoT devices 206), such as, without limitation, brand, model, operating system, apps, ISP, network provider, storage, language, time zone setting, Device ID, battery level, and/or log.

Location Data may include current and historical information that may be correlated between the user and the computing device to a particular location. Examples may include, without limitation, physical address, cell tower triangulation, IP address, GPS, Wi-Fi connections, and/or interactions with Bluetooth beacons.

Sensor Data may be generated by computing devices, such as by mobile device sensors and IoT sensors, including, but not limited to microphones, cameras, heart rate monitor, compass, GPS 326, thermometer, accelerometer, light sensor, proximity sensor, humidity sensor, and/or vibration sensor.

It will be appreciated that collected data (or processed data) may be categorized in more than one of the five identified categories. For example, but not limitation, a photo created by a security camera may be categorized as Identity Data, but may also be categorized as Sensor Data, or even Location Data. If the image is used to provide a unique identity, it preferably would be categorized as Identity Data. If the image is used for a simple count of customers, it likely would be categorized as Sensor Data. If the image provides evidence of a known individual patronizing a particular store, it may be categorized as Location Data. Behavioral or Identity data may depend on from where or from whom the data is collected.

Figure 4:
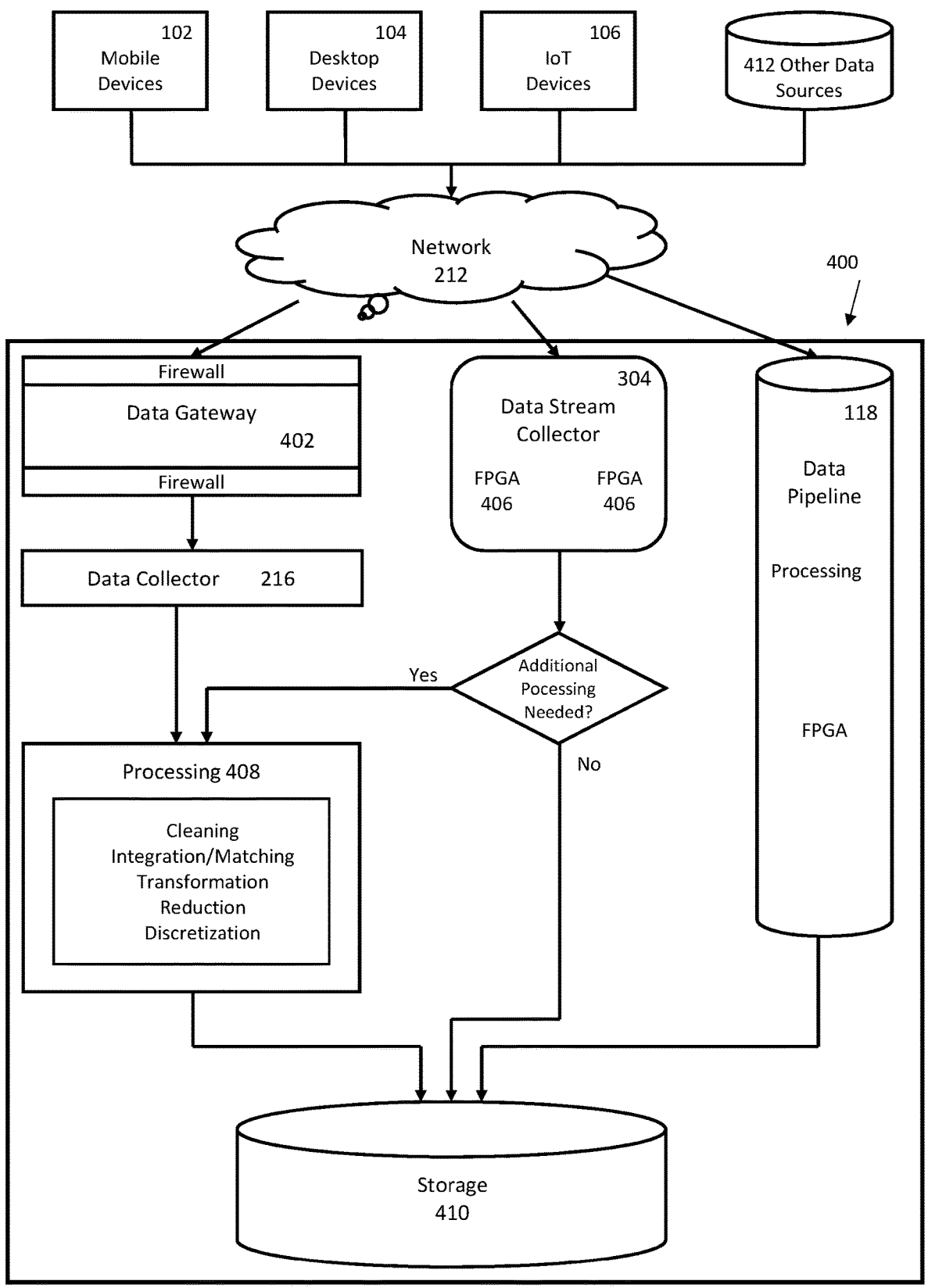
FIG. 4 illustrates a data collection module for use with the present inventions.

FIG. 4 illustrates a data collection module 400, such as one or more servers, suitable for use with the present inventions and configured to collect, process and create a dataset of tuples for a plurality of entities interacting with providers. The module 400 may comprise one more data gateways 402 configured to interface a network 212 and to interact directly with data collection tools previously described. A data collection module 216 may be configured to collect data from computing devices 202, 204, 206 and other data sources 412 in real time, or in periodic batches. Batch transfer of data may be initiated by a request from the data collector 216, or initiated by the computing device, the embedded data collection tools, or the other data sources. Still further, a batch transfer could take place on a scheduled interval.

In some embodiments, the data from the network 212 could be first collected by a third party before being collected by the data collector 216. A typical third party could be a web content provider, an app owner or developer, an analytics provider or an advertising network. Regardless of how or from where entity data is collected, the data may be logged and time-stamped, and stored in a data storage device 410. The data collection module 400 may comprise an individual server and interface, or collection of servers and interfaces, which might be co-located, or geographically distributed in multiple locations. The data collection module 400 may be configured to collect or extract additional data from one or more data sources 412. For example: the data gathering module 400 may scan available data sources to identify possible additional attributes for existing entities in the first or second dataset. The data collection module may comprise an update module or other capability configured to update the first or second dataset on demand or on a predetermined schedule.

In addition or alternately, the collection module 400 may comprise a data stream collector 404. It will be understood that the data stream collector 404 or module may be located anywhere in the world, and the data coining from millions of computing devices can overwhelm communications to one centralized collector and result in lost data. The data stream collector 404 may comprise a server and interface to receive the computing device data in real-time or near real-time and provide some processing of data to minimize the processing load on the data collection module 400. This preprocessing of streaming data also may reduce the amount of data needing to be stored 410, and may provide real-time information, as well as reducing the risk of data loss. In some embodiments, a data stream processing system 404 may comprise FPGAs 406, ASICs or other customizable hardware devices to provide faster throughput by operating independently or in conjunction with other processors. Additionally, FPGAs, ASICs or other customizable hardware devices may provide data stream filtering, such as through a Bloom Filter, and provide high speed preprocessing utilizing machine learning algorithms specifically designed for these FPGAs, ASICs or other specialized, customizable hardware devices.

In certain embodiments, one or more specialized FPGA devices may be placed in the data stream prior to the normal collection process. The FPGA may have specialized software configured to receive a user ID, time stamp and associated GPS coordinates from each reported GPS event; perform a lookup of the previous GPS event for that user ID; if the previous GPS event has the same GPS coordinates as the new event, the new event may be discarded; if the previous GPS event has different GPS coordinates from the new event, the new event GPS coordinates, user ID and time stamp are stored.

In other embodiments, the first and last event for each unique user ID/GPS coordinate may be recorded, and all other identical (or nearly identical) user ID/GPS coordinates may be discarded. When mapped to the GPS coordinate and site description described above, the output may be of this form:

| ID | GPS coordinate | Start | Finish | Duration | Site Identity |
|---|---|---|---|---|---|

A non-limiting example of pseudocode for FPGA filtering of GPS data stream may comprise the following:

```
# FPGA Load Reduction Pre-processing
# Filter out redundant GPS Positions
# return NULL for NO MOTION or previous coordinates for MOTION
get device_id, input_longitude_latitude
set index = table location position matching device_id or -1 if not found
if index = -1 then initialize table value for new device_id
    set index = next available position in local table for unique device_id
    set table_longitude_latitude (index) = input_longitude_latitude
# check for movement by comparing to previously stored location for
device_id
if input_longitude_latitude = table_longitude_latitude (index)
    return NULL   # NO MOTION / IGNORE
# Coordinates changed / Motion detected
# store previous location for return
set return_longitude_latitude = table_longitude_latitude (index)
# store current location in table for future motion detection
set table_longitude_latitude (index) = input_longitude_latitude
return return_longitude_latitude   # MOTION / PREVIOUS POSITION
```

For some embodiments, it may be preferred to position a specialized processing system nearer to the location of the data source(s) for data collection, analysis, and/or transmission. For example, video devices and other sensors typically create massive amounts of data when deployed at high-interaction locations, such as concerts or sporting events, or when capturing data from automobiles on a busy highway. These locations may not have adequate processing power or network facilities capable of transferring the volume of data and placement of an on-site computer for storage may be cost prohibitive due to the large amount of storage required or limitations on access to power or a secure location. As an alternative, a small stream processing system utilizing specialized hardware devices such as FPGAs or ASICs may be placed on site to filter, pre-process, and analyze the data. When properly configured, FPGAs, ASICs or other customizable, specialized hardware devices can provide dramatically faster throughput and reduced energy consumption when compared to general-purpose processors. Additionally, FPGAs are inherently resistant to tampering, providing a higher level of security. This would allow for the elimination or reduction of storage requirements and increased efficiency of data transmission.

Once the data is collected by the data collection module 400, the data preferably is processed so the collected data comprise a dataset, whether the exterior dataset or the interior dataset. As illustrated in FIG. 4, the system 100, or the data collection module 400 associated with the system 100, comprises a data processing module 408.

As discussed above, data, including the provider's user data, may have been collected from multiple heterogeneous sources, which may make the data noisy and enormous in volume. Since most of the data collection activity likely takes place between devices, it is not uncommon for large data systems to be created with no direct human observation, often with unsatisfactory results. Comprehensive understanding of the underlying attributes and data values is beneficial for ultimately creating the datasets and ultimately selecting or generating the correct relationship (e.g., statistical analysis or machine learning algorithms) for the second data set A first step in processing data may be to identify the type of attributes or fields that make up the data. An attribute may represent a characteristic or feature of a data object, such as an entity or user. Attributes may also be referred to as dimensions, features, or variables. Observed values for a given attribute are known as observations. A set of attributes used to describe a given object is called an attribute vector or feature vector. The type of an attribute is determined by whether the set of possible values are nominal, binary, ordinal, or numeric. Additionally, attributes may be discrete, such as having a finite or countably infinite set of values, which may or may not be represented as integers, or continuous, such as represented as floating-point variables.

Basic statistical descriptions can be used to identify properties of the data and detect potential concerns, such as noise or the presence of outliers. Measures of central tendency, such as mean, median, mode and midrange may give an indication of where most of the values fall and whether the data are positively skewed (i.e., when the mode is smaller than the median), negatively skewed (i.e., when the mode is greater than the median) or symmetrically distributed. Measures of dispersion such as range, quartiles, variance, standard deviation, and interquartile range may indicate the center, spread, and shape of the distribution and aid in detection of possible outliers. Graphic representations such as boxplots, quantile plots, q-q plots, histograms, and scatter plots may provide a visual inspection of the data and are useful for data preprocessing and identification of possible data correlations.

Other tests are available to provide further analysis and processing of the data. For example, tests for assessment of normality include the Kolmogorov-Smirnov test, the Lilliefors corrected K-S test, the Shapiro-Wilk test and the Anderson-Darling test. Levine's test and Bartlett's test provide an assessment of homogeneity of variances, and multicollinearity (correlation between two or more attributes) can be identified by Pearson's r, Spearman's rho and Kendall's tau test. Susceptibility to missing and erroneous data varies with different machine learning algorithms, and can lead to erratic and erroneous decisions, so accurate, complete and consistent data is useful for successful implementation of the present inventions. Possible strategies for improving the data quality prior to processing include data cleaning, data integration, data transformation, data reduction, and data discretization.

Mature industries, like credit reporting, control for noise, and inconsistent data in large, complex databases by requiring all data sources to use a standardized format (e.g., "Metro2"), and by limiting the data attributes or dimensions so some data sources may only report one transaction or event each month. By contrast, a single mobile phone 202, desktop computer 204, or IoT device 206 (i.e., computing device) may generate thousands of relevant events or transactions each month and these interactions could be reported by millions of primary sources and aggregators, all using different, proprietary formatting, and protocols. Data Cleaning involves filling in or deleting missing values, smoothing noisy data, identifying or removing outliers and resolving inconsistencies. As is known, missing values can be replaced with 1) a dummy value, 2) the mean, mode or median of the non-missing values, 3) regression substitution, 4) multiple imputation, 5) maximum likelihood estimation, or 6) simply ignoring the attribute.

Smoothing noisy data may be accomplished by sorting and partitioning groups of data in a "binning" process. Each bin may contain a group of values with an equal count or an equal range of values. The values in each bin may be replaced by a number representing the mean, median, or boundaries of the values for that bin. Smoothing may also be performed using regression methods to find the best line to fit the attributes or variables. Some classification methods, like Neural Networks, include integrated methods for data smoothing.

Outliers may be detected by grouping similar values into groups or "clusters." It is known that learning algorithms have varying degrees of resistance to outliers, but linear models are especially susceptible. Inconsistencies in data are typically resolved by converting to a standard format for each type of data. GPS data and Time/Date data are particularly prone to different formats and the consequential need for conversion. Also, nominal values can be converted to numeric values. For example, a binary field for "gender" could be converted from "male" or "female" to "0" or "1" for simpler computation. Some machine learning models deal with nominal values interiorly. Others, like neural nets, regression or nearest neighbor methods benefit from numeric inputs.

Data Integration may be used to process data, and involves combining varied data from multiple sources into a comprehensible data store, as in data warehousing. Integration of additional databases or files may be necessary for cross device identification, data validation, feature enhancement, or model training.

Schema integration can become prone to errors as the number of disparate data sources increase. The entity identification problem is a common example of the difficulties in matching equivalent real-world entities from multiple data sources. For example, but not limitation, "user_number" in one database may or may not refer to the same attribute as "user_id" in another database. Attribute values may have different representations in different databases, even for the same real-world entity. For example, one data source might represent values as metric units and another might represent values as British units.

Redundant or duplicate data may be caused by the same attribute having different names in different data sources, or one attribute may be a derived attribute in another data source. Redundant data may be detected by correlational analysis or by testing for covariance. Careful integration of the data from multiple sources may help reduce/avoid redundancies and inconsistencies and improve data mining speed and quality.

Figure 5:
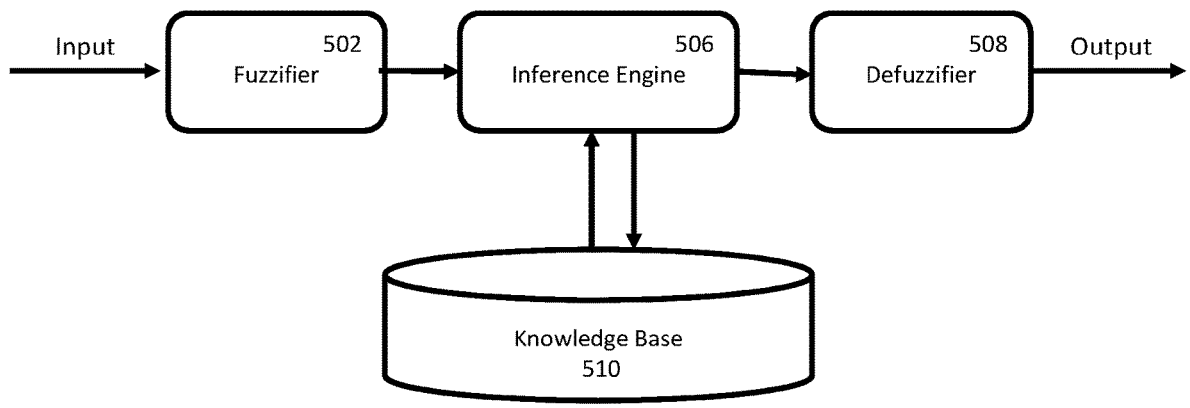
FIG. 5 illustrates an embodiment of a data processing module configured to associate identities within exterior and/or interior data.

FIG. 5 illustrates a module useful with the data collection system 400 and configured to associate a single entity with data from different data sources that do not use the same entity identifying information or format. Collected data may be processed by a data fuzzier module 502 and then passed through an inference engine module 506 with an associated knowledge base 510, as is known. The output from the inference engine module 506 may be passed to a data defuzzifier module 504, and then the resulting data may be used to entity information from different data sources.

Data transformation may comprises transformation or consolidation of the data to improve the relationship learning process, and make possible patterns easier to understand. Possible strategies include aggregation, generalization, and normalization and attribute construction. Aggregation involves summarizing or combining data, typically in construction of a data cube for multiple abstract levels of analysis. For example, event durations could be combined as weekly or monthly amounts. Generalization describes a process of combining nominal data like street or zip into a higher-level concept like county or state. Normalization is a method of standardizing the data in an attempt to give all attributes an equal weight. If one attribute changes the expression of weight from kilograms to ounces, the change in range for that attribute can change the weighting assigned to that attribute during analysis. If all measurement units are changed to a common range such as [−1, 1], the range distortions may be prevented. Neural network classification algorithms and nearest-neighbor classification and clustering algorithms are particularly sensitive to differences in attribute range. Typical normalization methods include min-max normalization, z-score normalization, and decimal scaling.

Data Reduction is the process of creating a smaller, more efficient version of the original dataset while maintaining the integrity of the original data. If performed properly, the reduced dataset should produce the same analytical outcome as the original dataset. Typical methods include dimensionality reduction, numerosity reduction, and data compression.

Dimensionality reduction reduces the number of attributes available for model creation. The discrete wavelet transform is a dimensionality reduction technique that allows for truncation of a portion of the data after a transformation process, while retaining an approximation of the original data. Principal component analysis uses combinations of the original data set attributes to create a smaller, alternative set of variables. Attribute subset selection reduces dimensionality by detecting and removing irrelevant or redundant attributes or dimensions.

Numerosity reduction uses parametric or non-parametric techniques to replace the original data with a smaller representation of the data. For parametric data, a regression or log-linear model of the original data is created, so only the parameters of the data require storage. For non-parametric data, representations of the data are created using histograms, clustering, sampling, and other models for reduced storage.

Data compression algorithms create a reduced representation of the original data in a compressed form that can often be reconstructed without loss of the original information. However, these methods generally allow only limited manipulation or processing of collected data.

Data Discretization techniques are used to transform continuous-valued variables into discrete variables. Some algorithms cannot use continuous values as input and are unable to predict continuous values. The Naïve Bayes algorithm is particularly susceptible to this limitation, but Support Vector Machines and Decision Trees have also been shown to run much more efficiently after conversion of continuous variables.

For numeric attributes (e.g., age) the raw values can be converted to interval labels (such as 0-10, 11-20, 21-30) or conceptual terms (such as youth, teen, or adult). The raw values can be grouped into buckets or bins using equal width or equal frequency binning Alternately, histograms can be used to partition the raw values by width or frequency. Both methods are considered to be unsupervised, since class information is not used in the process. Clustering techniques, Decision Trees, and Correlation Analysis are also effective for discretization of numeric data.

Nominal attributes have a finite (but potentially very large) number of distinct values, with no ordering of the values. In some cases, the values may be so numerous that the learning algorithm is unable to detect patterns in the data. Examples include city, phone_number, and street. Concept hierarchies based on schema definitions as well as the number of distinct values per attribute may be used to segment the data, and allow for mining at multiple levels of granularity.

Some attributes in the collected data may be reported as durational, but the duration is not presented in a standard format. For example, months, years, seconds or days. A durational conversion may convert these to a standard durational format for all records or tuples.

Certain time-related events may be combined or converted to become durational. For example, device logs may record install dates for apps, device drivers, and software updates using some version of system time. The duration since the install or update can be derived by subtracting the system time logged for the install or update from the current system time. An additional conversion step may be necessary to standardize the system times since, for example, Unix based devices and Windows based devices use different methods of calculating time.

In another non-limiting example, over time, a data collection module 400 may be configured to collect multiple time-stamped records for the same entity/user device showing apps, website visits, GPS points, phone numbers, and other information. At any later point, a durational conversion module can subtract the "earliest observation" of the same app, website visit, GPS point, phone number and other information from the current time to calculate the duration of user usage of that app, website, location or number.

Some user interactions are intermittent instead of continuous. For example, but not limitation, a donor donating to a charity (i.e., provider) may make regular donations most years but fail to donate some years. This donation pattern could be represented as a binary sequence of 1110110, with 1s representing calendar years with donations and 0s representing years without a donation. A durational conversion module may represent this as a six-year relationship from the earliest to the most recent donation. It may also make a statistical calculation to be added to the duration, based on the probability that the donor is still active in year seven and will make future donations.

Record Linkage may be used to match all records (i.e., interactions) relating to the same entity/user. As discussed earlier, the collection of data may consist of thousands of sources reporting millions of records with multiple, non-standardized attributes. The data typically may contain noisy, incomplete and incorrectly formatted information. Data may be recorded or captured in various, possibly obsolete formats and data items may be missing, duplicated, out of date, or contain errors.

For the relatively simple process of linking just two datasets, the number of possible comparisons equals the product of the number of records in the two datasets. For example, linking two datasets with 100,000 records each would result in ten billion possible record pair combinations. Yet, processing of all ten billion possible record pair combinations would result in a maximum of only 100,000 true matched record pairs, for a 0.001% match rate. As datasets increase in size, the computational effort increases exponentially.

To reduce the number of comparisons made, a blocking technique may be employed to eliminate comparisons between records that obviously are not matches. By using one or a combination of record attributes, the data set can be split into blocks where only records having the same blocking variable are compared. Each record pair derived from the blocking process then uses one or more record attributes in a variety of field comparison functions. Each function returns a numerical weight based on the level of similarity for each value. These weights are combined to form a weight vector for each record pair, which is then used to classify the record pairs as matches, non-matches or possible matches.

Deterministic Linkage relies on a unique identifier, such as a social security number or a unique user number. Alternately, combinations of linking variables such as first name, last name, date of birth and gender can be used to create a statistical linkage key (SLK). Deterministic Linkage requires exact matches, so the linking variables need to be accurate, robust, complete, and stable over time. Another deterministic linkage method, Rule-Based Linkage, uses a pre-determined set of rules to determine if pairs should be classified as links or non-links. In a Stepwise Deterministic Linkage strategy, records are matched in a series of progressively less restrictive steps in which record pairs that do not meet a first round of match criteria are passed to a second round of match criteria for further comparison.

Probabilistic Linkage, also called Fuzzy Matching, classifies pairs of records as matches if their common attributes predominantly agree, or as non-matches if they predominantly disagree. Weights may be calculated for each identifier based on its estimated ability to identify correctly a match or a non-match. These weights are used to calculate the probability that two given records refer to the same entity. Record pairs with probabilities above a certain threshold are considered to be matches, while pairs with probabilities below another threshold are considered to be non-matches. The sum of the "match" probability and the "non-match" probability is always a number less than 1.0, leaving a user tunable "fuzzy" region of possible matches between the two probabilities.

In contrast to Boolean Logic, Fuzzy Logic can handle the concept of partial truth, where the truth may exist on a continuum between completely true and completely false. As discussed, FIG. 5 illustrates an example of fuzzy operations, where mathematical input values can be mapped to fuzzy membership functions by a fuzzifier module 502. All applicable rules from a knowledge base 510 may be applied by an inference engine module 506. A defuzzifier module 508 operation may be used to map the fuzzy output membership functions into a crisp output value.

Machine Learning techniques also can be used in conjunction with the Fuzzy Matching process to process data. For example, a hybrid technique where class assignments are made to a sample of the data through unsupervised clustering, and the resulting data is then used as a training set for a supervised classifier using a decision tree or an instance based classifier. Another technique based on machine learning is to train distance measures used for approximate string comparisons, using high Jaro-Winkler distance or low Levenshtein distance to identify sufficiently similar pairs.

There are $2^n$ possible link/non-link combinations of n fields, so Probabilistic Record Linkage uses M and U probabilities for agreement and disagreement between a range of linking variables. The "M-probability" is the probability of a link given that the pair of records is a true link (constant for any field), where a non-link occurs due to data errors, missing data or instability of values. The "U=probability" is the probability of a link given that the pair of records is not a true link, or the chance that two records will randomly link, typically estimated as the proportion of records with a specific value, based on the frequencies in the primary or more comprehensive and accurate data source.

The quality of record linkages can be measured in the following dimensions: The number of record pairs linked correctly (true positives); The number of record pairs linked incorrectly (false positives or Type I errors); The number of record pairs unlinked correctly (true negatives); The number of record pairs unlinked incorrectly (false negatives or Type II errors)

Various measures of quality can be defined from these dimensions, including: Sensitivity: the number of correctly linked record pairs divided by the total number of true match record pairs. Specificity: the number of correctly unlinked record pairs divided by the total number or true non-match record pairs. Match rate: the total number of linked record pairs divided by the total number of true match record pairs. Precision or Positive predictive value: the number of correctly linked record pairs divided by the total number of linked record pairs.

A first pass of the data may be made to identify a first set of relationships that are relatively easy to determine. For example, unique data, such as customer identifiers, phone numbers, email addresses, and advertising identifiers. A second pass could then attempt to match the remaining set of unmatched relationships by using the fuzzy-matching techniques.

Thus, those persons of skill having benefit of this disclosure will understand how to process data collected from various sources to create an exterior dataset and/or an interior dataset, such as an augmented interior dataset for use with the present inventions. Embodiments of data collection systems 400 useful to populate the exterior or interior dataset, or to augment the interior dataset may comprise one or more of the following:

1. Primary data sources: (computing devices may exist in multiple categories)
    a. Mobile devices, e.g., mobile phone, tablet, laptop.
    b. On-line devices, e.g., (home or work compute.
    c. Internet of Things connected device, e.g., wearable sensor, home monitor, smart refrigerator, smart television, alarms, medical devices, Amazon Echo, Google Home.
2. Tracker/Data reporting interface, e.g., app provider, website owner, ad network, or analytics provider.
    a. SDK
    b. API
    c. Cookies
    d. Web beacons/web bugs
    e. JavaScript tags
    f. Embedded scripts
    g. Persistent cookies
    h. Clear gifs
    i. HTML5
    j. Pixel tags
    k. Bluetooth beacons
3. Network types for data transfer
    a. Wireless
    b. Internet
    c. Dedicated circuit
    d. Switched network
4. Data transfer control
    a. Pull
    b. Push
        i. Time schedule
        ii. Upon event
5. Information path from Tracker/Data reporting interface
    a. Direct to data collection module
    b. To a data stream analytics module
    c. To Tracker/Data reporting interface to system 100
    d. To shared server to system 100
6. Data types
    a. Personal Identity
        i. name
        ii. Mobile number
        iii. Language
        iv. Email address
        v. Usernames
        vi. Passwords
        vii. Business name
        viii. Google Advertising ID (GAID)
        ix. ID for Advertisers (IDFA)
        x. ID for Vendors (IDFV)
    b. Device identity
        i. MAC address
        ii. Device type
        iii. Software version
        iv. Attached devices
        v. Device manufacturer
        vi. Mobile service provider
        vii. ISP
        viii. Browser
        ix. Installed software
        x. Installed apps
        xi. Operating system
        xii. Model number
        xiii. Android ID
        xiv. International Mobile Equipment Identifier (IMEI)
    c. Location identity
        i. IP address
        ii. GPS
        iii. Cell tower locations
        iv. Wi-fi locations
        v. Time zone setting d. Behavioral data
   i. Time and Duration of calls
   ii. Called/calling party number/name
   iii. SMS usage
   iv. Time, duration and frequency of app usage
   v. Time, duration and frequency of websites visited
   vi. Network status (wireless, web, Wi-Fi, Bluetooth)
   vii. Social media usage time, duration and frequency
   viii. Search terms and patterns
   ix. Subscriptions
   x. Online registrations
   xi. Travel patterns
   xii. Locations visited, duration and frequency
   xiii. Awake time
   xiv. Hobbies, interests
e. Demographic data
   i. Age
   ii. Gender
   iii. Date of birth
   iv. Image
7. Data logging As discussed above, a provider likely has an existing or prior interaction relationship with its users whose interactions generate data. Because of these interactions, the provider typically has a collection of information about its existing and prior users that may comprise one or more attributes of the interactions or the user, such as, but not limited to, the duration of the relationship between the provider and its user.

The system 100 (e.g., FIG. 1) preferably comprises a graphical user interface or GUI configured to allow a provider to upload its user data (also referred to in this embodiment as interior or training data) to the system 100. As discussed above, some user data may not be legally available for a provider to upload to the System 100, so the provider may need to enter a pre-approved authorization code in the GUI to allow the system 100 to use certain data. Nonetheless, it is preferred that the provider upload to the system 100 all of the information that the provider has for its current and prior users. Alternately, the system 100 may be configured to receive the provider data other than by uploading through the GUI.

The GUI also may be used by the provider at the backend of the system 100 to download or direct results generated for the provider by the system. The provider may use the GUI to force inclusion or exclusion of certain types of data from the relationship modeling process. For example, a provider may want to avoid existing users of a known competitor or may want specifically to target users of a known competitor. A provider may have prior knowledge of known undesirable attributes unrelated to the desired attribute, e.g., duration or persistence.

Figure 6:
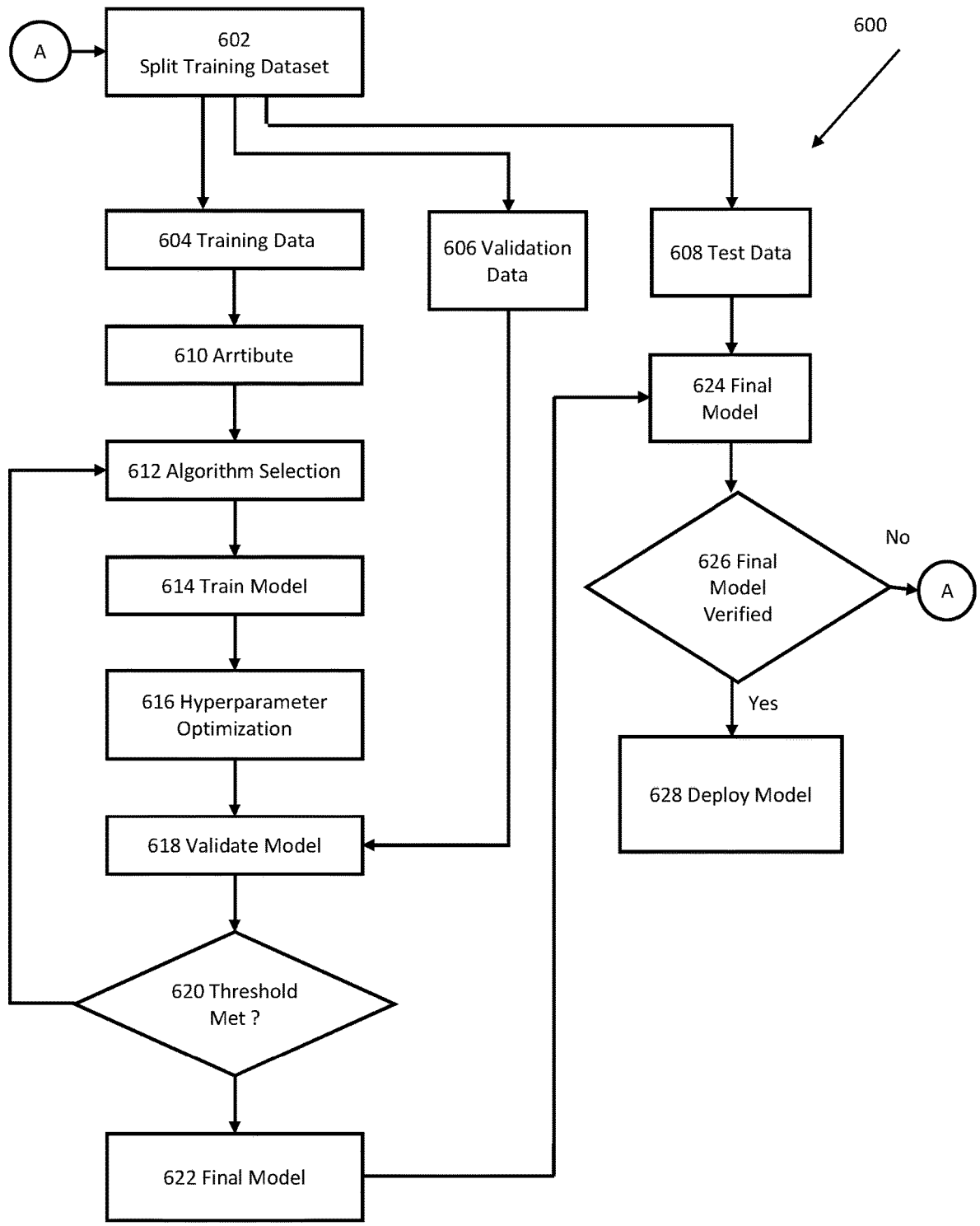
FIG. 6 illustrates an aspect of the present inventions concerning creating a relationship model for interior or exterior datasets.

As described above, once the data has been collected and processed, the exterior dataset may be created (and preferably routinely updated). The interior dataset, which preferably includes data from the provider and additional user data supplied from the exterior dataset or other data sources 412, also may be created. As illustrated in FIG. 6, once the interior, or training, dataset is created, the training data set preferably may be randomly split 602 into, for example, three subsets: a training datasubset 604, validation datasubset 606 and test datasubset 608. For example and not limitation, 60% of the dataset may comprise the training datasubset 604, 20% may comprise the validation datasubset, and the remaining 20% may comprise the testing datasubset.

Before the training data set is processed by the relationship modelling module 600, one or more dataset attributes, such as but not limited to a durational attribute, is identified among the features in the training dataset. Preferably, the provider identified the dataset attribute(s) (i.e., target attribute) through the system 100 GUI. Prior to generating a relationship model on the training dataset, it is preferred that the relevant features in the training dataset be identified from among all the dataset features. In other words, not all of the dataset features may be relevant to modelling for the target attribute(s).

Feature selection is important when handling a huge dataset with dimensions up to thousands. Whereas an irrelevant feature does not affect describing the target attribute in any way, a redundant feature does not add anything new to describing the target attribute. Redundant features might possibly add more noise than useful information in describing the attribute of interest. The main benefits of feature selection are follows: (i) reducing the measurement cost and storage requirements, (ii) coping with the degradation of the classification performance due to the finiteness of training sample sets, (iii) reducing training and utilization time and, (iv) facilitating data visualization and data understanding.

Generally, features are characterized as: (i) Relevant: features which have an influence on the output and their role cannot be assumed by the rest, (ii) Irrelevant: features not having any influence on the output, (iii) Redundant: a feature can take the role of another.

The goal of feature selection is to find the optimal subset consisting of in features chosen from the total n features in the training dataset. One problem for many feature selection methods is that an exhaustive search strategy has to be applied to seek the best subset among all the possible feature subsets, which usually results in a considerably high computational complexity. The alternative suboptimal feature selection methods provide more practical solutions in terms of computational complexity but they cannot promise that the finally selected feature subset is globally optimal.

The relevance of the features can be evaluated either individually (univariate approaches), or in a multivariate manner. Univariate approaches are simple and fast, therefore, appealing. However, possible correlation and dependencies between the features are not considered. Therefore, multivariate search techniques may be helpful. Several limitations restrict the use of multivariate searches. First, they are prone to overtraining, especially in settings with many features and few samples. Second, they can be computationally too expensive when dealing with a large feature space.

Filter methods are fast and easy to interpret. The characteristics of filter methods are: (i) Features are considered independently, (ii) Redundant features may be included, (iii) Some features, which as a group have strong discriminatory power but are weak as individual features will be ignored, and (iv) The filtering procedure is independent of the classifying method.

The characteristics of wrapper methods are: (i) Computationally expensive for each feature subset considered, since the classifier is built and evaluated, (ii) As exhaustive searching is impossible, only greedy search is applied. The advantage of greedy search is simple and quickly to find solutions, but its disadvantage is not optimal, and susceptible to false starts, (iii) It is often easy to overfit in these methods.

Another type of feature subset selection is identified as embedded methods. In this case, the feature selection process is done inside the induction algorithm itself, i.e.

attempting to jointly or simultaneously train both a classifier and a feature subset. They often optimize an objective function that jointly rewards the accuracy of classification and penalizes the use of more features.

A feature selection framework generally consists of two parts: a searching engine used to determine the promising feature subset candidates, and a criterion used to determine the best candidate. Search Strategies may comprise: Complete, heuristic, and nondeterministic. Complete may comprise an exhaustive search is complete since it covers every combination of N features.

Two classic exhaustive search implementations are depth-first search and breadth-first search. Both types of search can be forward or backward in feature generation. In a forward generation scheme, it starts with an empty set, then considers the possible subsets of one feature, two features, etc. subsequently. This process is reversed for a backward generation scheme, starting with the full set of features. Regardless of their directions, the essence of the two types of search is the systematic examination of every possible subset.

Complete and heuristic search strategies share one property in common, i.e., they are all deterministic. That means no matter how many times one runs a particular algorithm, one can expect that the solution from any subsequent run is always the same as that of the first run. For nondeterministic learning algorithms, one cannot expect the same solution from different runs. One of the major motivations for developing this sort of algorithm is to avoid getting stuck in local minima as in heuristic search. Another motivation is to capture the interdependence of features which heuristic search is also incapable of capturing. Among the four nondeterministic algorithms, RAND and genetic algorithms produce multiple solutions, but simulated annealing and neural networks give single solutions.

Once the relevant features are identified, the training dataset 604 may be passed to the relationship module 600, which in the embodiment of FIG. 6 comprises an algorithm selection module 612, an algorithm training module 614, and optimization module 616, and a model validation module 618.

Because a preferred embodiment of the present inventions use training data with at least one "durational feature or attribute," supervised learning algorithms, such as Regression, Trees, Rule-based, ensembles, and/or classifiers, are preferred. There are no set rules to define which supervised algorithms should be used for a given embodiment. The experience of the data scientist can help guide the order for testing different types of algorithms, but sometimes a brute force method of deploying as many different algorithms and combinations of algorithms as possible may be appropriate.

There are also some known interactions of features and expected outcomes that can restrict or influence the choice of the learning algorithm. For example, all supervised algorithms require some data preparation, but some algorithms require specific transformations to allow the algorithm to best expose the information contained in the data.

Some algorithms require a large amount of training, possibly involving iterative decisions and additional work to interpret the results by a human operator. Additionally, learning algorithms vary in their resource requirements and interpretability.

All supervised learning algorithms assume labeled training data and require all data examples to be independent and identically distributed. Supervised algorithms also assume the data to have constant variance and a normal distribution of errors.

Linear regression and general linear models further require linearity, some normality, homoscedasticity, constant variance, independence of errors and lack of multicollinearity.

Classification is a form of data analysis that extracts models describing data classes. A classifier, or classification algorithm, predicts categorical labels (classes). Regression models predict continuous-valued functions. Classification and numeric prediction are the two major types of prediction algorithms.

Decision tree induction is a top-down recursive tree induction algorithm, which uses an attribute selection measure to select the attribute tested for each nonleaf node in the tree. ID3, C4.5, and CART are examples of such algorithms using different attribute selection measures. Tree pruning algorithms attempt to improve accuracy by removing tree branches reflecting noise in the data. Early decision tree algorithms typically assume that the data are memory resident. Several scalable algorithms, such as RainForest, have been proposed for scalable tree induction.

Naïve Bayesian classification is based on Bayes' theorem of posterior probability. It assumes class-conditional independence—that the effect of an attribute value on a given class is independent of the values of the other attributes.

A rule-based classifier uses a set of IF-THEN rules for classification. Rules can be extracted from a decision tree. Rules may also be generated directly from training data using sequential covering algorithms.

A confusion matrix can be used to evaluate a classifier's quality. For a two-class problem, it shows the true positives, true negatives, false positives, and false negatives. Measures that assess a classifier's predictive ability include accuracy, sensitivity (also known as recall), specificity, precision, F, and $F_-$. Reliance on the accuracy measure can be deceiving when the main class of interest is in the minority.

Construction and evaluation of a classifier require partitioning labeled data into a training set and a test set. Holdout, random sampling, cross-validation, and bootstrapping are typical methods used for such partitioning.

Significance tests and ROC curves are useful tools for model selection. Significance tests can be used to assess whether the difference in accuracy between two classifiers is due to chance. ROC curves plot the true positive rate (or sensitivity) versus the false positive rate (or 1 specificity) of one or more classifiers.

Ensemble methods can be used to increase overall accuracy by learning and combining a series of individual (base) classifier models. Bagging, boosting, and random forests are popular ensemble methods.

The class imbalance problem occurs when the main class of interest is represented by only a few tuples. Strategies to address this problem include oversampling, undersampling, threshold moving, and ensemble techniques.

Unlike naïve Bayesian classification (which assumes class conditional independence), Bayesian belief networks allow class conditional independencies to be defined between subsets of variables. They provide a graphical model of causal relationships, on which learning can be performed. Trained Bayesian belief networks can be used for classification.

Backpropagation is a neural network algorithm for classification that employs a method of gradient descent. It searches for a set of weights that can model the data to minimize the mean-squared distance between the network's class prediction and the actual class label of data tuples. Rules may be extracted from trained neural networks to help improve the interpretability of the learned network.

A support vector machine is an algorithm for the classification of both linear and nonlinear data. It transforms the original data into a higher dimension, from where it can find a hyperplane for data separation using essential training tuples called support vectors.

Frequent patterns reflect strong associations between attribute-value pairs (or items) in data and are used in classification based on frequent patterns. Approaches to this methodology include associative classification and discriminant frequent pattern-based classification. In associative classification, a classifier is built from association rules generated from frequent patterns. In discriminative frequent pattern-based classification, frequent patterns serve as combined features, which are considered in addition to single features when building a classification model.

Decision tree classifiers, Bayesian classifiers, classification by backpropagation, support vector machines, and classification based on frequent patterns are all examples of eager learners in that they use training tuples to construct a generalization model and in this way are ready for classifying new tuples. This contrasts with lazy learners or instance-based methods of classification, such as nearest-neighbor classifiers and case-based reasoning classifiers, which store all of the training tuples in pattern space and wait until presented with a test tuple before performing generalization. Hence, lazy learners require efficient indexing techniques.

In genetic algorithms, populations of rules "evolve" via operations of crossover and mutation until all rules within a population satisfy a specified threshold. Rough set theory can be used to define approximately classes that are not distinguishable based on the available attributes. Fuzzy set approaches replace "brittle" threshold cutoffs for continuous-valued attributes with membership degree functions.

Binary classification schemes, such as support vector machines, can be adapted to handle multiclass classification. This involves constructing an ensemble of binary classifiers. Error-correcting codes can be used to increase the accuracy of the ensemble.

Semi-supervised classification is useful when large amounts of unlabeled data exist. It builds a classifier using both labeled and unlabeled data. Examples of semi-supervised classification include self-training and co-training.

Active learning is a form of supervised learning that is also suitable for situations where data are abundant, yet the class labels are scarce or expensive to obtain. The learning algorithm can actively query a user (e.g., a human oracle) for labels. To keep costs down, the active learner aims to achieve high accuracy using as few labeled instances as possible.

Neural networks, such as two-layer neural network with one hidden layer of four neurons, one output layer of two neurons, and three inputs also may be used as part of the relationship modelling module 600.

Linear Regression algorithm attempts to find the plane that minimizes the sum—of squared errors (SSE) between the observed and predicted response. Decision trees are recursive partitioning algorithms. For every candidate input variable, the algorithm will assess the best way to split the data into two or more subgroups defined by the split. For every subgroup, it then repeats the process by splitting each subgroup of data in the same manner. (This is the recursive part of the algorithm.) It continues splitting and splitting until all the records after a split belong to the same target variable or until another stop condition is applied. A Regression Neural Network begins with a node that receives a set of weighted inputs, processes their sum with its activation function and passes the result of the activation function to nodes further down the graph. These nodes are chained together in layers; one node layer's outputs are connected to the next layer's inputs. The algorithm trains by learning the correct edge weights to produce the target output given the input. The result from training any of these algorithms is a function that operates on input data to make a prediction about a desired output.

For regression-based learners, the "goodness" of the trained model is primarily determined by the accuracy of the predicted score generated by the model, when compared to the actual "true" score. This is usually expressed as the "coefficient of determination" known as $R^2$. $R^2$ measures the percentage of the variance of the target variable that is explained by the model. Some software packages also include additional metrics to help determine if the model is being influenced by bias, skew or outliers in the input data.

These algorithms train themselves by seeking to minimize SSE or sum—of squared errors between the observed and predicted response. $R^2$ is derived from the formula $R^2=1-SSE/SST$, where SSE is the "error sum of squares" and quantifies how much the data points vary around the estimated regression line. In effect, this formula punishes large prediction errors more than small prediction errors, and creates a positive predictive measure that will be expressed as a linear value on a scale from 0.0 and 1.0. An $R^2$ value of 0.58 would indicate that 58% of the variance of the target variable is explained by that model.

A cluster is a collection of data objects that are similar to one another within the same cluster and are dissimilar to the objects in other clusters. The process of grouping a set of physical or abstract objects into classes of similar objects is called clustering. Cluster analysis can be used as a stand-alone data mining tool to gain insight into the data distribution, or as a preprocessing step for other data mining algorithms operating on the detected clusters. Clustering is related to unsupervised learning in machine learning. Typical requirements include scalability, the ability to deal with different types of data and attributes, the discovery of clusters in arbitrary shape, minimal requirements for domain knowledge to determine input parameters, the ability to deal with noisy data, incremental clustering, and insensitivity to input order, the capability of clustering high-dimensionality data, constraint-based clustering, as well as interpretability and usability.

Many clustering algorithms have been developed. These can be categorized from several orthogonal aspects such as those regarding partitioning criteria, separation of clusters, similarity measures used, and clustering space. This chapter discusses major fundamental clustering methods of the following categories: partitioning methods, hierarchical methods, density-based methods, and grid-based methods. Some algorithms may belong to more than one category.

A partitioning method first creates an initial set of k partitions, where parameter k is the number of partitions to construct. It then uses an iterative relocation technique that attempts to improve the partitioning by moving objects from one group to another. Typical partitioning methods include k-means, k-medoids, and CLARANS.

A hierarchical method creates a hierarchical decomposition of the given set of data objects. The method can be classified as being either agglomerative (bottom-up) or divisive (top-down), based on how the hierarchical decomposition is formed. To compensate for the rigidity of merge or split, the quality of hierarchical agglomeration can be improved by analyzing object linkages at each hierarchical partitioning (e.g., in Chameleon), or by first performing microclustering (that is, grouping objects into "microclusters") and then operating on the microclusters with other clustering techniques such as iterative relocation (as in BIRCH).

A density-based method clusters objects based on the notion of density. It grows clusters either according to the density of neighborhood objects (e.g., in DBSCAN) or according to a density function (e.g., in DENCLUE). OPTICS is a density-based method that generates an augmented ordering of the data's clustering structure.

A grid-based method first quantizes the object space into a finite number of cells that form a grid structure, and then performs clustering on the grid structure. STING is a typical example of a grid-based method based on statistical information stored in grid cells. CLIQUE is a grid-based and subspace clustering algorithm.

Clustering evaluation assesses the feasibility of clustering analysis on a data set and the quality of the results generated by a clustering method. The tasks include assessing clustering tendency, determining the number of clusters, and measuring clustering quality.

In conventional cluster analysis, an object is assigned to one cluster exclusively. However, in some applications, there is a need to assign an object to one or more clusters in a fuzzy or probabilistic way.

Fuzzy clustering and probabilistic model-based clustering allow an object to belong to one or more clusters. A partition matrix records the membership degree of objects belonging to clusters.

Probabilistic model-based clustering assumes that a cluster is a parameterized distribution. Using the data to be clustered as the observed samples, we can estimate the parameters of the clusters.

A mixture model assumes that a set of observed objects is a mixture of instances from multiple probabilistic clusters. Conceptually, each observed object is generated independently by first choosing a probabilistic cluster according to the probabilities of the clusters, and then choosing a sample according to the probability density function of the chosen cluster.

An expectation-maximization algorithm is a framework for approaching maximum likelihood or maximum a posteriori estimates of parameters in statistical models. Expectation-maximization algorithms can be used to compute fuzzy clustering and probabilistic model-based clustering.

High-dimensional data pose several challenges for cluster analysis, including how to model high-dimensional clusters and how to search for such clusters. There are two major categories of clustering methods for high-dimensional data: subspace clustering methods and dimensionality reduction methods.

Subspace clustering methods search for clusters in subspaces of the original space. Examples include subspace search methods, correlation-based clustering methods, and biclustering methods. Dimensionality reduction methods create a new space of lower dimensionality and search for clusters there.

Biclustering methods cluster objects and attributes simultaneously. Types of biclusters include biclusters with constant values, constant values on rows/columns, coherent values, and coherent evolutions on rows/columns. Two major types of biclustering methods are optimization-based methods and enumeration methods.

Spectral clustering is a dimensionality reduction method. The general idea is to construct new dimensions using an affinity matrix.

Clustering graph and network data has many applications such as social network analysis. Challenges include how to measure the similarity between objects in a graph, and how to design clustering models and methods for graph and network data.

Geodesic distance is the number of edges between two vertices on a graph. It can be used to measure similarity. Alternatively, similarity in graphs, such as social networks, can be measured using structural context and random walk. SimRank is a similarity measure that is based on both structural context and random walk.

Graph clustering can be modeled as computing graph cuts. A sparsest cut may lead to a good clustering, while modularity can be used to measure the clustering quality.

SCAN is a graph clustering algorithm that searches graphs to identify well-connected components as clusters.

Constraints can be used to express application-specific requirements or background knowledge for cluster analysis. Constraints for clustering can be categorized as constraints on instances, on clusters, or on similarity measurement. Constraints on instances include must-link and cannot-link constraints. A constraint can be hard or soft.

Hard constraints for clustering can be enforced by strictly respecting the constraints in the cluster assignment process. Clustering with soft constraints can be considered an optimization problem. Heuristics can be used to speed up constrained clustering.

Thus, a person of skill in the art having benefit of this disclosure will be able to configure a relationship modelling module 600 that generates a function that predicts an attribute value (Y), such as a durational attribute, from other durational and non-durational data (x) in the training dataset, e.g, $Y=f(x_1)(x_2) \ldots (x_n)+error$. Once the relationship function is generated 618, the function may be validated by deploying the function on the validation dataset 606. If the validation run meets the sufficiency requirements 620 set for the function, the function may be considered final. Otherwise, the relationship modelling module may be restarted 612.

Assuming the function is finalized on the validation dataset, the function may be deployed on the test datasubset 608 of the training data. If the function is verified on the test dataset 608, the function may be deployed 628 on the exterior dataset, such as the modified exterior dataset. As described, above, deploying the function 626 on the exterior dataset will identify entities with the exterior dataset that meet (or meet and exceed) the target attribute requirements established by the provider, such as, but not limited to, a duration attribute of a predetermined value. In the preferred embodiment of the present inventions, the first dataset is the exterior dataset, and the second data set is the interior or training dataset of the provider's users. Once the results of the deployed function on the exterior dataset are generated, the system 100 may further generate a report, such as a dataset of exterior dataset entities satisfying the target attribute requirements.

In addition or alternately, the provider may use the GUI to filter the output 628 from the function deployed on the first dataset. For example, a smaller provider may only have resources to attempt to attract a small subset of the desirable candidates from the first dataset, and may choose to limit the number of entities in the output. A provider may want to pursue potential new users in a defined geographic area. A provider may only want to pursue potential new users who can be contacted in a specific manner, such as by a valid phone number; a valid email address; a specific mobile device; or an ID from a specific Ad Network.

If the function fails verification 626 on the test dataset 607, or even fails the sufficiency requirements 620 on the training datasubset 604, the training dataset may require further or additional processing. Transfer learning techniques may be used to transform the dataset for reprocessing by the relationship modelling module 600. It will be understood that a well-designed relationship model module 600 may show excellent results when applied to validation 606 and test 608 datasets, yet perform poorly when applied to different exterior (i.e., non-training) datasets. In another example, a model that initially performs well may show declining results over time. In another example, a model designed to predict a persistence attribute for new potential users of a particular product or service may need to be re-deployed to predict persistence for new potential users of a different product or service.

These three examples may represent a situation where the original model was subject to the common assumption that the training and test data are drawn from the same feature space and the same distribution. Passage of time or changes in application of the models may result in a distribution change that conflicts with this assumption, requiring a time-consuming and costly process of re-collecting the training data and rebuilding the models.

Transfer learning techniques may provide an efficient and effective alternative to the process of rebuilding the models. Transfer learning allows the domains, tasks, and distributions to be different by applying knowledge from a previous task to a new, but related task.

One exemplary method involves the application of Transductive Transfer Learning, with a goal of a common space or a mapping that bridges the domains. This approach learns new data representations by minimizing the distance between two domain distributions. It will be appreciated that a feature-based transfer learning method has an expectation of some degree of relationship between the source and target domain, with some overlapping of features. This framework, which is just one of many different types of transfer learning techniques useful with the present inventions, comprises: (1) extracting information from the source and target environments, (2) measuring the feature similarity, and (3) mapping the features to a common space.

The existing source data and target data are combined for any needed data processing, After processing, the combined data are fed into a feature extraction module. One method of discovering information by feature extraction utilizes the Principal Component Analysis (PCA) algorithm. PCA uses an orthogonal transformation to convert a set of observations of possibly correlated variables into a set of values of linearly uncorrelated variables called principal components. PCA may help reduce dimensionality and reveal the interior structure of the data. One alternative to PCA is Transfer Component Analysis (TCA). TCA attempts to minimize the distance between domain distributions by projecting data onto the learned transfer components.

The combined features are measured for feature similarity. Possible methods of similarity measurement include mutual information, correlation coefficient, Euclidian distance, Manhattan distance, Minkowski distance, Jaccard similarity, and cosine similarity.

The features and measurements are fed into a mapping process module. The mapping process attempts to pair a one-on-one link between the source and target features by finding the similarity with the highest value. This process may be formatted as a graph matching system. The pairing process can produce (1) features with no pair, (2) features with one-on-one pairs, and (3) features with more than one pair. Typically, features with no pair are held for potential future pairing and the features with more than one pair use measurement values to select the best one-on-one pairing. The completed feature mapping in the source and target domains are then projected to a common space.

The original source data may be applied to build a classifier or multiple classifiers for the purpose of evaluation the accuracy of the target features created by the previous process. The F-score may be used to evaluate the accuracy of the classifier in the form of a confusion matrix, showing results for true positive, false positive, false negative and true negative. The precision score, recall score and F-measure are calculated from these four parameters. This provides a method to compare the results of a new model crested from the transfer learning process to the prior model.

Figure 7:
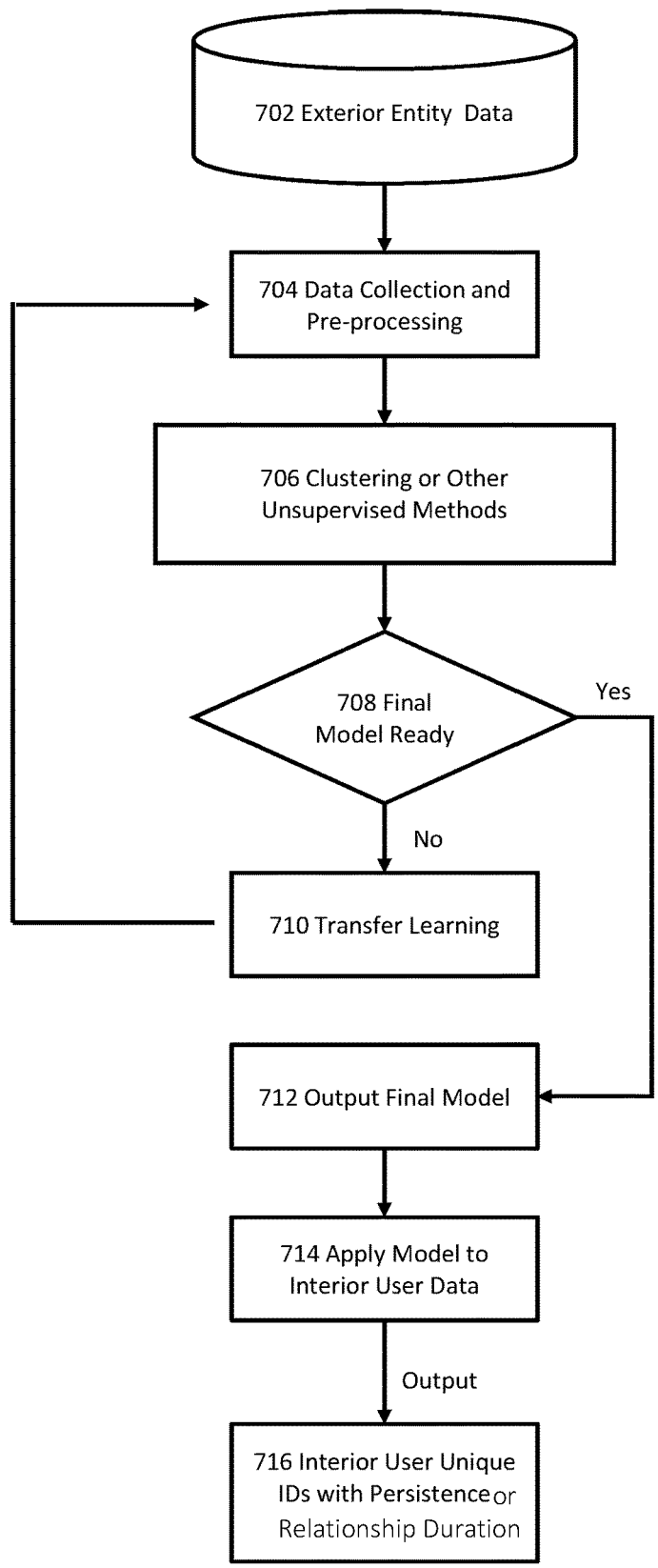
FIG. 7 illustrates another embodiment of the present inventions in which a relationship model is created for an exterior dataset and applied to an interior user dataset.
Figure 8:
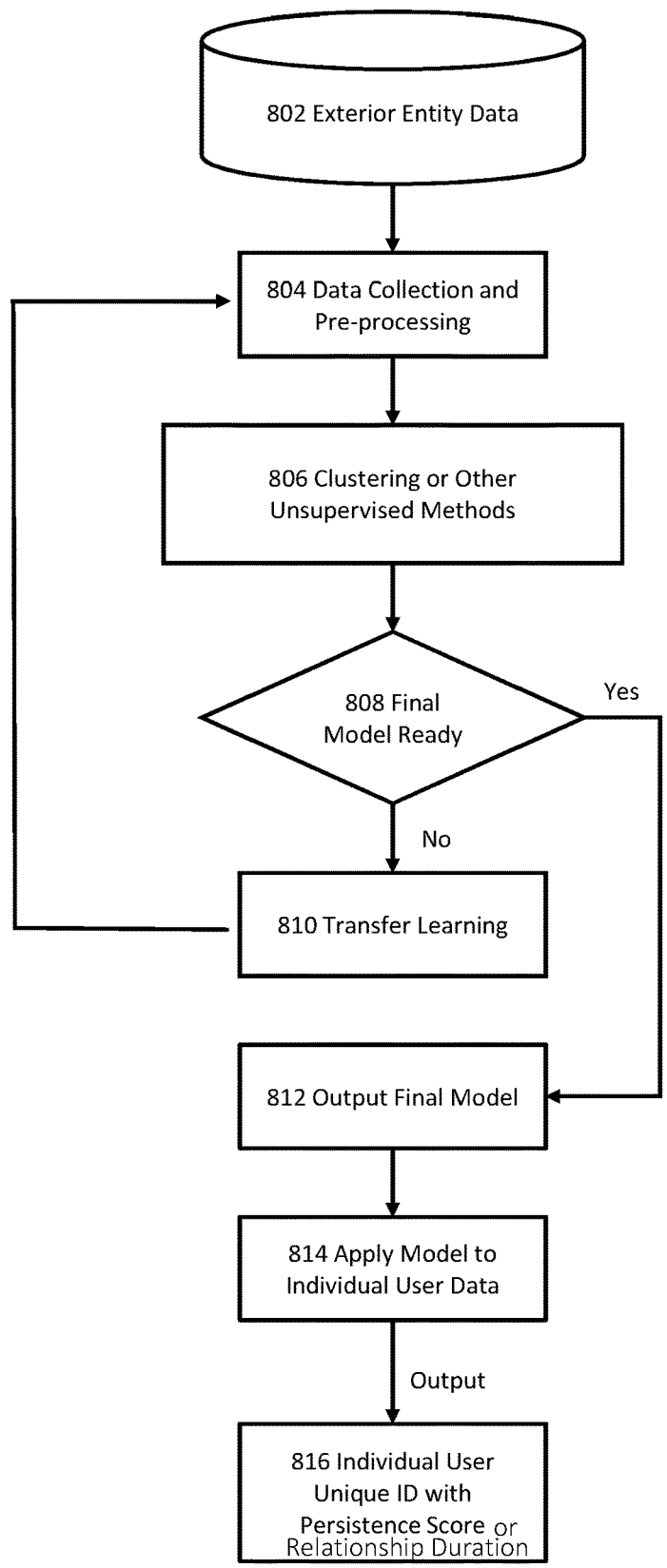
FIG. 8 illustrates yet another embodiment of the present inventions in which a relationship function is created for an exterior dataset and applied to individual user data.

FIGS. 7 and 8 illustrate alternate embodiments of the present inventions in which the exterior dataset 702, 802 of new potential users of a provider is the training data set. Applying the present inventions to the exterior datasets as illustrated in FIGS. 7 and 8 allows the system 100 to predict those current (or current and former) users of the providers goods and services that meet the provider's attribute requirements, such as relationship duration (FIG. 7), or, for example, to establish an attribute value for an individual user, such as a persistence score.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A system for predicting business loyalty, comprising:
   one or more programmable processors operationally associated with memory storing instructions that when executed by the one or more programmable processors causes the one or more programmable processors to perform operations comprising:
   collecting information associated with a plurality of entities from a plurality of external sources, including at least one source comprising GPS data;
   identifying a plurality of entity parameters from the collected entity information;
   creating a first dataset from the collected entity information, the first dataset organized so that each entity is associated with one or more of the entity parameters identified from the collected information;

collecting customer information about the business' former and/or existing customers;

creating a second data set from the customer information, the second dataset organized so that a specific customer is associated with one or more of the plurality of entity parameters;

augmenting the second dataset with information from the first dataset where a specific entity in the first data set is equated with a specific customer in the second dataset;

creating one or more predictive models on the second dataset that generate one or more values representative of relationship duration with the business;

applying the one or more predictive models created on the second dataset on the first dataset to generate one or more values representative of business relationship duration; and creating a report of entities other than customers that are predicted to exhibit the desired business relationship duration.

2. The system of claim 1, wherein the one or more programmable processors comprise one or more field programmable gate arrays and/or one or more application specific integrated circuits having specialized software for processing the at least one source of GPS data.

3. The system of claim 2, wherein the first dataset comprises entity information collected from a plurality of Internet devices or wireless network devices.

4. The system of claim 3, wherein the first dataset comprises location data.

5. The system of claim 2, wherein the second dataset comprises data for each customer related to length of association with the business.

6. The system of claim 4, wherein the second dataset is split into a training dataset, a validation dataset, and a testing dataset for a predictive model learning algorithm.

7. The system of claim 2, comprising modifying the first dataset by removing data for entities that are also specific users in the second dataset before the one or more predictive models is deployed on the first dataset.

8. The system of claim 6, wherein the second dataset is augmented with data for entities in the first dataset that correspond to customers in the second dataset before the training dataset, testing dataset and validation dataset are created.

9. The method of claim 1, wherein the first dataset comprises information concerning entity identity, entity behavior, entity information source or device, entity location, and entity sensor.

10. The system of claim 2, wherein the one or more programmable processors having one or more field programmable gate arrays and/or one or more application specific integrated circuits comprises a data stream processor providing data stream filtering.

11. A system for predicting a business relationship duration, comprising:

a plurality of processors comprising at least one programmable processor operationally associated with memory having executable instructions; and at least one data stream processor having one or more field programmable gate arrays and/or one or more application specific integrated circuits having specialized executable instructions for processing streaming data, such that when the plurality of processors execute instructions operations are completed comprising:

collecting information about a plurality of entities from a plurality of external sources, including at least one source comprising entity GPS data;

identifying a plurality of entity parameters from the collected entity information;

creating a first dataset from the collected entity information;

associating entities with one or more of the entity parameters identified from the collected information;

collecting customer information about the business' former and/or existing customers;

creating a second dataset from the collected customer information;

associating existing and/or former customers with one or more of the plurality of entity parameters from the collected entity information;

supplementing the second dataset with information from the first dataset where a specific entity in the first data set is associated with a specific existing or former customer in the second dataset;

creating one or more predictive models on the second dataset that generate predictions representative of relationship duration with the business;

applying the one or more predictive models created on the second dataset on the first dataset to generate predictions representative of business relationship duration; and creating a report of entities from the first dataset that are predicted by the one or more models to exhibit the desired business relationship duration.

12. The system of claim 11, wherein the first dataset comprises entity information collected from a plurality of Internet devices or wireless network devices.

13. The method of claim 11, wherein the first dataset comprises information concerning one or more of entity identity, entity behavior, entity information source or device, entity location, and entity sensor.

14. The system of claim 12, wherein the first dataset comprises entity location data.

15. The system of claim 11, wherein the second dataset comprises data for each existing or former customer related to length of association with the business.

16. The system of claim 11, wherein the second dataset is split into a training dataset, a validation dataset, and a testing dataset for a predictive model learning algorithm.

17. The system of claim 11, comprising modifying the first dataset by removing data for entities that are also found in the second dataset before the one or more predictive models are deployed on the first dataset.

18. The system of claim 16, wherein the second dataset is augmented with data for entities in the first dataset that correspond to existing or former customers in the second dataset before the training dataset, testing dataset and validation dataset are created.

19. The system of claim 11, wherein the at least one data stream processor provides data stream processing.

20. The system of claim 19, wherein the at least one data stream processor provides data stream filtering.

* * * * *